United States Patent [19]
Morgenstern

[11] Patent Number: 5,970,490
[45] Date of Patent: Oct. 19, 1999

[54] INTEGRATION PLATFORM FOR HETEROGENEOUS DATABASES

[75] Inventor: Matthew Morgenstern, Ithaca, N.Y.

[73] Assignee: Xerox Corporation, Stamford, Conn.

[21] Appl. No.: 08/963,853

[22] Filed: Nov. 4, 1997

Related U.S. Application Data

[60] Provisional application No. 60/030,215, Nov. 5, 1996.
[51] Int. Cl.⁶ ..................................................... G06F 17/30
[52] U.S. Cl. ............................. 707/10; 707/103; 707/104
[58] Field of Search ................................. 707/10, 103, 104

[56] References Cited

U.S. PATENT DOCUMENTS

| | | | |
|---|---|---|---|
| 5,560,005 | 9/1996 | Hoover et al. | 707/10 |
| 5,627,979 | 5/1997 | Chang et al. | 345/335 |
| 5,724,575 | 3/1998 | Hoover et al. | 707/10 |
| 5,758,351 | 5/1998 | Gibson et al. | 707/104 |
| 5,761,684 | 6/1998 | Gibson | 707/515 |
| 5,809,507 | 9/1998 | Cavanaugh, III | 707/103 |
| 5,815,415 | 9/1998 | Bentley et al. | 364/578 |

OTHER PUBLICATIONS

Common Object Request Broker Architecture, http://www.sei.cmu.edu/activities/str/descriptions/corba_body.html, Jan. 10, 1997.

Object Request Broker, http://www.sei.cmu.edu/activities/str/descriptions/orb_body.html. Jun. 25, 1997.

Primary Examiner—Wayne Amsbury
Assistant Examiner—Shahid Alam
Attorney, Agent, or Firm—Diana M. Cox

[57] ABSTRACT

A method for processing heterogeneous data including high level specifications to drive program generation of information mediators, inclusion of structured file formats (also referred to as data interface languages) in a uniform manner with heterogeneous database schema, development of a uniform data description language across a wide range of data schemas and structured formats, and use of annotations to separate out from such specifications the heterogeneity and differences that heretofore have led to costly special purpose interfaces with emphasis on self-description of information mediators and other software modules.

18 Claims, 5 Drawing Sheets

ARCHITECTURE OF THE DATABASE INTEGRATION PLATFORM

INTEGRATION PLATFORM FOR HETEROGENEOUS DATABASES

This application claims priority of Provisional U.S Pat. Application No. 60/030,215, filed Nov. 5, 1996 the subject matter of this application is fully incorporated herein.

This invention was partially funded by the U.S. Government and the U.S. Government has certain rights to the invention.

The present invention is a method for processing heterogeneous data and more particularly is a method for heterogeneous data which uses an interoperability assistant module with specifications for transforming the data into a common intermediate representation of the data using the specifications and creating an information bridge with the interoperability assistant module through a process of program generation.

Currently, databases used for design and engineering employ a variety of different data models, interface languages, naming conventions, data semantics, schemas, and data representations. Thus a fundamental problem for concurrent engineering is the sharing of heterogeneous information among a variety of design resources. Successful concurrent engineering also requires access to data from multiple stages of the design life-cycle, but the diversity among data from different tools and at different stages creates serious barriers.

Although there have been several efforts directed at heterogeneous databases, a significant need continues to exist for design, engineering, and manufacturing applications to be able to easily access and import heterogeneous data. Efforts to develop global query languages do not address the large group of users who want to see the world of external data as if it were an extension of their existing system and its specialized representation. These users may not wish to learn a different global representation—and more importantly, their expensive design tools can only work with their one specialized representation.

Database gateways, Common Object Request Broker (CORBA), and Open Database Connectivity (ODBC) interfaces which purport to address heterogeneity only do so at a relatively superficial level. Database gateways provide communication mechanisms to external systems—but only if those systems have a relational interface. That is, the system must either processes SQL queries or at least must provide a relational application programming interface (API). Since an API is a set of functions to be accessed via remote or local procedure invocation, a relational API presents data in terms of named arrays (relation tables) that contain flat tuples, with one data value per column in each tuple, and with the number of columns fixed per named array. The functions' names and parameters are defined in the API and may vary depending upon the gateway. Application programmers must write their programs to invoke the functions of a particular API. The proposal for an ODBC standard offers the potential for a single agreed upon naming of the functions in the API. In addition, the CORBA approach allows more than a single API 'standard' to coexist, as it can locate an appropriate interface from a library of interfaces.

In all these cases, the programmer still has to write the application code to invoke the several functions defined in the interface. Data transformations and reformatting may be needed on the source side of the API, the target side of the API, or often on both sides. All of this is left to the programmers, who must implement this on a case by case basis. Unfortunately, there is little or no pre-existing software from which these translators can be built, and each effort usually begins from scratch. While some vendors offer import translators from a few common formats, in general these do not provide sufficient interoperability.

Moreover, if the target use of the data expects non-relational data( e.g., linked, nested, or other format) then additional data transformation will be needed, and normally this too can involve a significant programming effort. Even, within the relational data mode., there usually are several ways of designing the relational tables, in terms of which attributes are in which tables—that is, there usually is more than one way to normalize the data. If the application needs to see the data differently than the API provides, then data transformations are needed. Thus, it is often necessary for an organization to write specialized translators for their particular requirements, and each effort usually begins from scratch. While some vendors offer import translators from a few common formats, in general these do not provide sufficient interoperability.

Previous related work in the database field can be grouped roughly into three areas: access to heterogeneous databases (HDBs), schema integration, and object encapsulation of existing systems.

Access to HDBs: Language features for multidatabase interoperability include variables which range over both data and metadata, including relation and database names, and expanded view definitions with provisions for updatability. Selected translation or mapping approaches are known and others which are based upon the 5-level architecture are described in Sheth and Larson. Approaches to semantics-based integration and access to heterogeneous DBs where semantic features are used to interrelate disparate data and resolve potentially different meanings are known. Seen from a higher level, what are needed are mediation services among different representations and systems.

Schema Integration: Database design tools have been applied to schema integration, and related work formalizes interdatabase dependencies and schema merging. Some related approaches utilize view-mapping, and data migration. Some of the work in this area assumes that the resulting target schema or view is to be relational rather than another heterogeneous representation. Much of the work on data semantics also is applicable to semantics of schema integration.

Object Encapsulation: Since object technology can hide the implementation and data structures within objects, it is interesting to consider encapsulation and the hiding of heterogeneity within object interfaces, with one or more interfaces being specially crafted for each heterogeneous database. Some of the work in this area includes the FINDIT system [6], object program language interfaces, and an execution environment for heterogeneous software interfaces. These object approaches serve to hide, rather than obviate, the specialized programming which still is needed for each application. Sciore has done interesting work on the use of annotations to support versioning, constraint checking, defaults, and triggers.

SUMMARY OF THE INVENTION

One aspect of the present invention is drawn to a method for integrating heterogeneous data embodied in computer readable media having source data and target data including providing an interoperability assistant module with specifications for transforming the source data, transforming the source data into a common intermediate representation of the data using the specifications, transforming the intermediate representation of the data into a specialized target representation using the specifications. An information bridge is created with the interoperability assistant module through a process of program generation and the source data is processed through the information bridge to provide target data wherein the target data is in a non-relational form with respect to the source data.

The DAtabase Integration SYstem (DAISy) of the present invention provides both high-level user interfaces and program level access across heterogeneous databases (HDBs), allowing integration of a wide variety of information resources including relational and object databases, CAD design tools, simulation packages, data analysis and visualization tools, and other software modules. DAISy eliminates tedious and costly specialized translators. A key focus is on reusability of components through a specification-based approach. A declarative specification language is utilized to represent the source and target data representations. This high level data structure specification (HLDSS) provides a uniform language for representing diverse databases and specialized file formats, such as produced by CAD tools. In addition, a rule-like specification applies functional transformations in a manner similar to that of production rule systems and term-rewriting systems. These specifications are utilized to create information mediators and information bridges each of which can access heterogeneous data resources and transform that information for use by databases and specialized representations. In all cases, the data is mapped to an intermediate internal format. This also provides reusability of each information mediator to support multiple applications. Each of the information bridges are created through a program generation process, and this process and the associated tools within the DAISy platform are reused for each new information bridge which is created.

BRIEF DESCRIPTION OF THE DRAWINGS

Other features of the present invention will become apparent as the following description proceeds and upon reference to the drawings, in which.

DETAILED DESCRIPTION OF THE INVENTION

Figure 1:
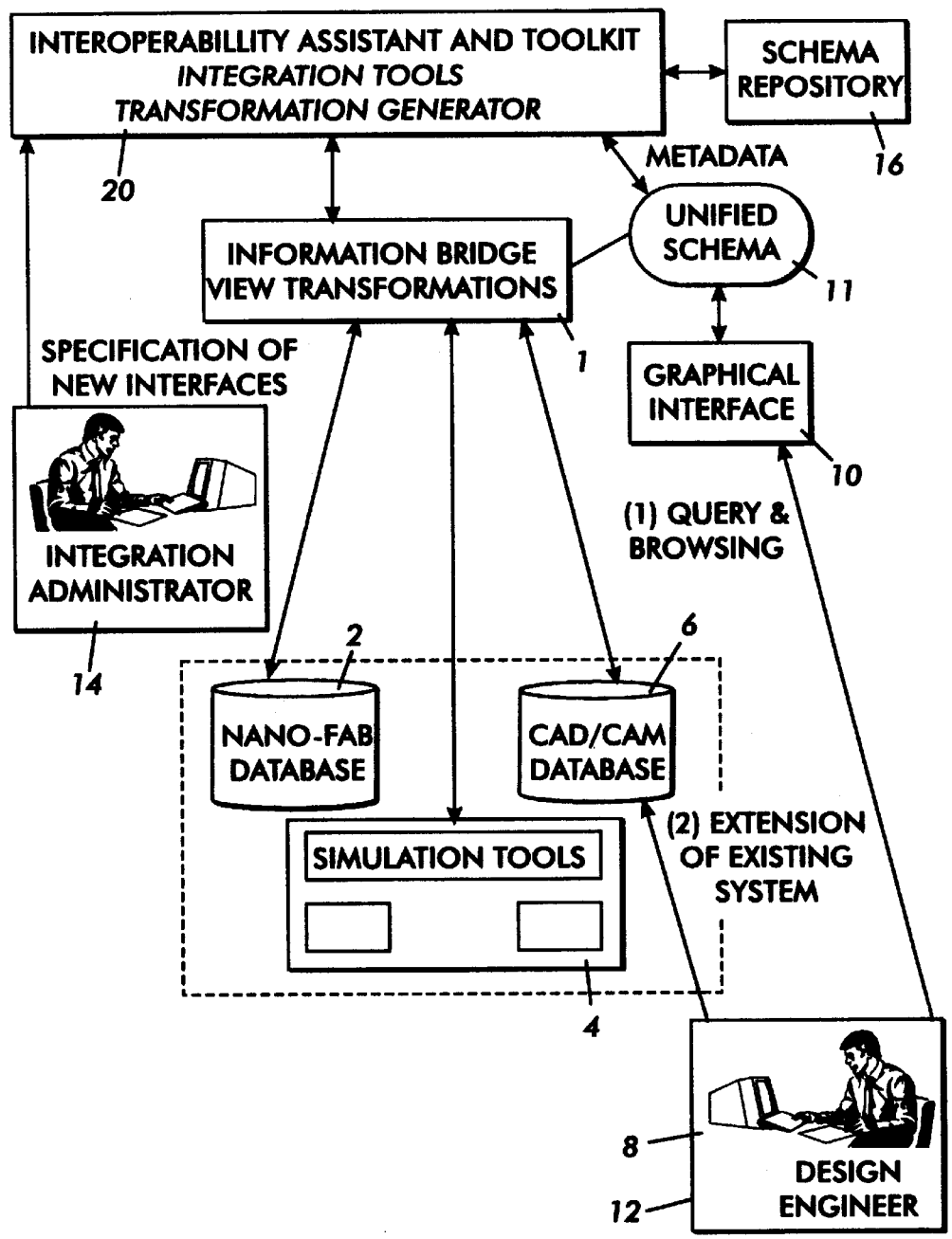
FIG. 1 shows the architecture of the database integration platform.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

The types of heterogeneity which are addressed by the present invention include different schemata, different data models, differences in physical storage and access issues, and differences in semantics and meaning of the data. Such types of structural and semantic heterogeneity have been a primary impediment to effective data interoperability across disparate organizations.

An expeditious approach to address heterogeneity is to map specialized and idiosyncratic terminology into an agreed upon standard for description and representation of application data. With this approach, the description of a specialized information resource would be given in terms of the agreed upon standard model.

When a standardized model or other neutral model is selected, then for N client sites or databases, one needs 2N transformations—i.e. N bi-directional mappings between each client information resource and the central model. Creation of such standardized application models is the goal of various standards efforts, including the PDES/STEP effort—DAISy can interface with such standardized models. When a standardized model is not available, other approaches may be pursued.

Even when there is no standard model, semantics may be captured in terms of islands of agreement—that is, localized semantic models. Each local model would be self-consistent and utilize a common vocabulary (sometimes this is referred to as an ontology). However, a term in different models or islands may have different meanings. A collection of such islands of agreement may address a substantial portion of the semantics of a large application.

As a simple example, in the United States the use of feet, inches, and miles for length forms one semantic island of agreement, while the use of pounds, ounces, and tons for weight forms another island—these two semantic islands often occur together, but one deals with length while the other deals with weight. Analogous but different semantic islands occur in Europe where meters and centimeters are used for length, and kilograms and grams are used for weight. Even the meaning of the weight 'pound' also depends on the semantic island, as there is both the troy system pound (which is 0.373 kg) and the avoirdupois pound (which is 0.454 kg). The word 'pound' as a unit of measure also occurs in another semantic island for monetary currency, as in the British pound. Conversion between different semantic islands also can be time dependent, as in the conversion of dollars to yen.

Another example of an island of agreement is the topological map, which takes on a precise meaning in conjunction with a legend that specifies which visual map representations are associated with which topological features. The legend appeals to a commonly agreed upon model of topological maps, and in so doing it makes precise the semantics of the map by specifying the choice of features and visual representations to be used in that map. In some sense, the legend helps to make a map self-describing.

Many actual applications are not fortunate enough to have either an agreed upon standard model, nor to he describable by an adequate set of localized models which are commonly accepted. Of course, one can create a semantic model for an application of interest, and such may be desirable. But when creating information mediators and data transformations, it is not desirable to preclude applications where neither the time nor resources are available to first create such specialized semantic models. Thus the present invention has been developed which not only encompasses standard application models and local models when they exist, but which also supports interoperability in the absence of such models.

The key to accomplishing these goals across a wide variety of applications is the use of high level descriptions and specifications—for both the given application's representation of its data, as well as for specification of the executable transformations. The information bridge methodology also supports direct transformations in the absence of semantic models. The actual transformation process itself is similar whether the target is an agreed upon standard model or a just a specialized representation for a particular application. What differs when an adequate semantic model is not available is the extra effort to specify all the transformations explicitly and to ensure that they are correct and complete.

Developing generalizable technology which can be applied to a wide variety of situations is highly desirable. This is one of the reasons high level descriptions and specifications are used in the present invention.

Since as high a level of input description as possible is desired, with only essential details, much analysis of these specifications is needed to create and operationalize an information mediator. A simple interpreter of these specifications would not have had enough information to proceed without such analysis. Thus a second motivation for the program generation approach was to find a convenient way of capturing the results of the analysis, especially where tailored code needed to be generated.

The high level specifications are used to drive application generators which tailor and/or create the necessary transformations, programs for data access, and software interfaces. The result is generation of a specific information mediator or information bridge for use between disparate information resources. Such mediation and transformation may utilize an intermediate common model or may be a direct mapping, depending upon the specification.

In this manner, a variety of kinds of information resources utilizing a common specification language and internal representation can be supported. The design can support heterogeneous databases with different schemas and data models, such as multiple relational and object-oriented databases, and other application packages, such as CAD, CAE, and CASE (Computer Aided Design, Computer Aided Engineering, and Computer Aided Software Engineering) tools, which produce specialized data structure representations.

The overall architecture of the system is reviewed in FIG. 1 and consists of several primary modules. The information bridge 1 transforms data from heterogeneous data resources 2, 4 and 6, for example, respectively a Nano-Fabrication Database, Simulation Tools, and a CAD/CAM (Computer Aided Design/Computer Aided Manufacturing) Database into a common intermediate representation and then into a specialized target representation—as determined by the specifications. The target representation may be another database with a different data model and schema, or the target may be a specialized data structure needed by a design tool.

A system user 8 may access the information bridge 1 in a variety ways. One way of accessing uses an optional browser 10, shown as a graphical interface to view and browse the combined uniform schema 11 and data obtained from multiple data sources 2, 4, and 6. Queries also may be posed against a common view of the data collection in order to focus the resulting view for additional browsing. Another way of accessing the information bridge is through existing tools 12 and the various data representations 2, 4 and 6 those tools understand. In this case, the information bridge completes the transformation process and imports the external data into this specialized representation.

The information bridge 1 is created by the interoperability assistant (IA) module 20 through a process of program generation. The specific transformations which are compiled into the information bridge are derived from the specifications which an integration administrator 14 provides, with this process being facilitated by some of the tools provided by the IA 20 subsystem.

Self-description is an important organizing principal for highly distributed very large heterogeneous information networks. It enables the automatic self-registration of software modules and software agents simply by their being presented to a registry service, shown as schema repository 16. This registry then need only query the module via command line arguments or via an applications programming interface (API) to obtain sufficient registration and usage requirements information. The application generation stages have been implemented to automatically generate such self-description information for the created application code and the generated executable modules.

The self-description information can aid the interoperability assistant (IA) 20 to decide if and when the bridge needs to be rebuilt, or what sub-parts need to be rebuilt. Self-description information also describes the function and purpose of the information mediator. Because all of this information is self-contained, there is no need to search for configuration and source files, attempt to match up version numbers, or wonder which 'readme' files go with which modules.

The self-description includes the HLDSS and HLTRS high level specifications, with a timestamp of when they were created, the full file names of the primary intermediate files and modules utilized during creation of this information mediator bridge, the time of creation of the bridge, and additional information. Each of these self-description attributes can be queried separately or as a group, the latter being shown. Since some of these intermediate files were themselves created by the IA's application generation process, each such file also contains in its header a description of the HLDSS or HLTRS which gave rise to its production. One of the several benefits of such self-description is that it simplifies the management of generated source code and the resulting compiled modules. This can be especially useful in a large system.

Once a set of basic self-description attributes, together with an extensible set of additional attributes are agreed upon, the module can list its full set of self-description attributes as one of the pieces of information it provides. So long as the meaning of the extended attributes can be determined by the registry, a substantial amount of operational and semantic information can be conveyed automatically.

There are several approaches to ensuring that a registry is able to understand and use the extended attributes. The simplest is that the full set be standardized, but only the basic set are required. A second approach is for the module to provide a description of each extended attribute in some agreed upon simple description language. The third approach is for the registry to consult with another registry for a description of the additional features. One of the software module's self-description attributes would be the identifier of the registry where these extended attributes are defined. In this manner, software modules can be imbued with the intelligence needed to make their capabilities and assumptions known.

A new software package then can be registered automatically once the existence of the package is known. In this case, the server invokes the package with the standard argument requesting its self-description, and the server then enters that information into its database. Later if the server is queried as to the existence of a software package that provides some set of functions, the server can respond by checking the attributes and values of registered packages, and return information on all that match the query. Other information can be provided in the self-description, such as the units of measurement that are used, semantic details, general information, and perhaps cross-referencing of other documentation (e.g., manual pages or documents that describe some standard implemented by the software).

Because the self-description information is self-contained within the package itself, it increases the usefulness of the package by not requiring information about it to be scattered around the system in the form of documentation files, source code comments, configuration files, and post-it notes on the screen of the last person that compiled the package. There is a great deal of potential information that can be stored in the self-description, and while there are few servers that utilize that information currently, the system has been designed to provide such information and other metadata for the next generation of intelligent software agents.

Figure 2:
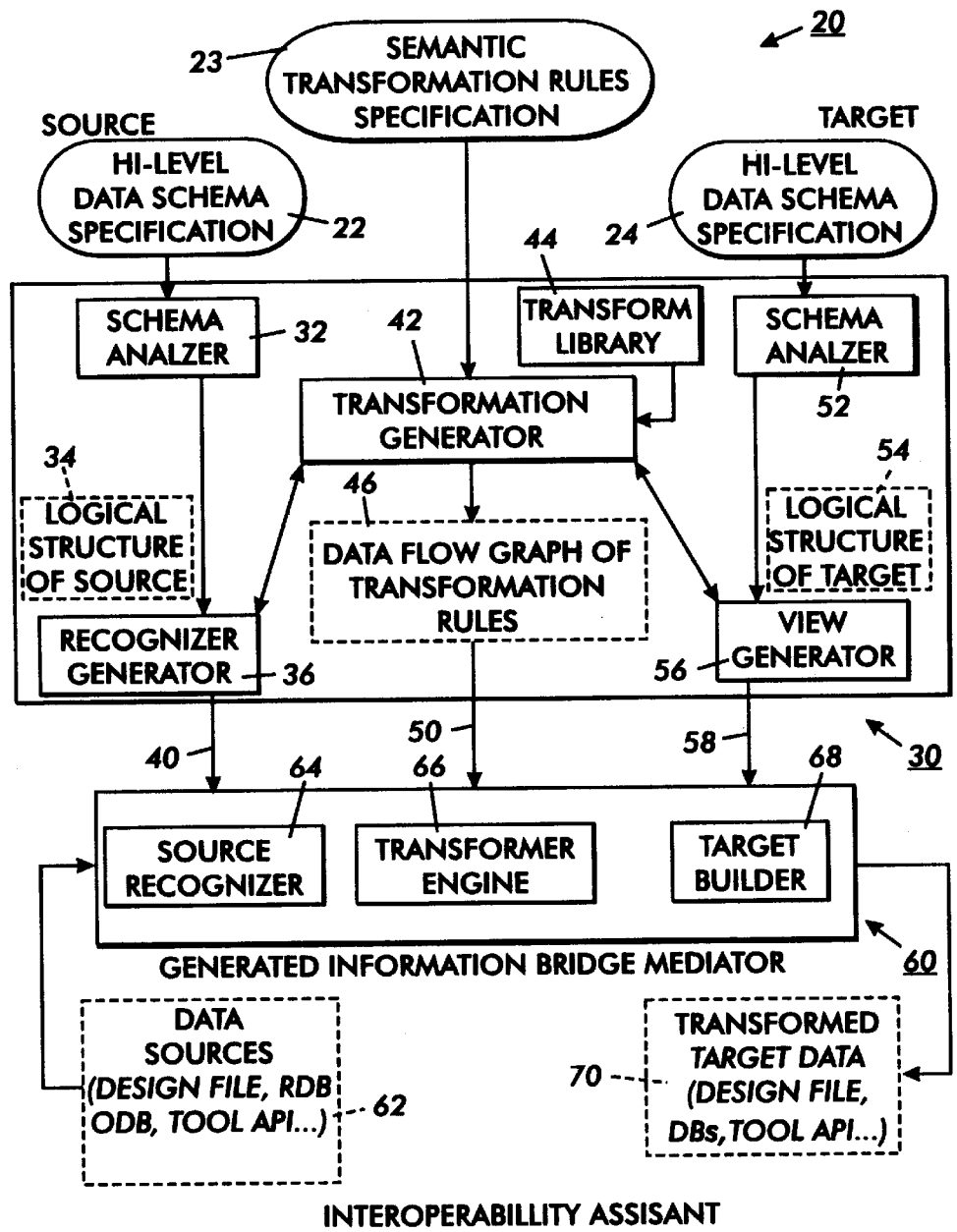
FIG. 2 shows details of the interoperability assistant of the SYstem.

The IA 20 consists of several internal modules as shown in FIG. 2. The input to the IA consists of two high level data structure specifications (HLDSS) and a high level transformation rule specification (HLTRS). These are created with the help of other tools associated with the IA subsystem. The HLDSS data representation is reusable for all applications which need to access this data resource, for either input or output and may be edited as desired.

The two HLDSS data structure specifications describe the source 22 and target 24 representations respectively. Both the source 22 and target 24 may be very different heterogeneous data resources. Each may be an object, relational, or other database, or a specialized data file and structure, or an application program interface (API) to a software package, such as a CAD tool.

The structure within the IA subsystem consists of several intermediate stages and modules. Most of the code in the resulting information mediator is created through generation module 30 which is completely driven by the high level HLDSS and HLTRS specifications. The output of the IA is a compiled information bridge mediator 60, which when executed, provides the desired transformations between heterogeneous representations.

The execution of the IA 20 module is distinct from the execution of an information bridge 1. The IA module is active in a system generation phase and generates code which compiles into an information bridge. In other words, an information bridge is the end result of the system generation phase; data resources are not involved during this phase. After an information bridge has been generated, then the bridge can be executed (the information bridge execution phase) at which time the data transformation occurs.

From another perspective, if the same data transformation process is required more than once, on different data instances, then the IA analysis and code generation is only executed once (when the information bridge is built) and the information bridge is executed for each data transformation. The integration administrator would be the individual most likely to be involved with system generation whereas more general users would be involved with just the execution phase of the information bridges.

The input that the IA module uses to generate the code for an information bridge comes from the three high-level specification files that were described above. As discussed earlier, the high level data structure specification (HLDSS) describes the logical and physical representation of a set of data resources. The production rules of the HLDSS allow the IA module to generate an internal intermediate logical representation of the data while the annotations on the production rules (and the attributes of these annotations) describe the physical representation of the data.

The IA module requires one HLDSS to describe the heterogeneous input data sources 22 and another HLDSS to describe the target representation 24. The third input to the IA module is the high level transformation rule specification (HLTRS) 23. The HLTRS 23 is a set of rewrite rules on the logical representation of the data so that the source data representation can be transformed (possibly through intermediate representations) to the target data representation.

A number of activities occur during system generation processing in the IA generation module 30. First, the source 22 and target 24 HLDSS must both undergo schema analysis. Schema analyzers, source schema analyzer 32 and target schema analyzer 52, parse the HLDSS and create logical structure diagrams (LSDs), source LSD 34 and target LSD 54. The LSD is an internal context-independent representation of the data resource schemata and structures. The actual data instances (which are only present during bridge execution and not during bridge generation) populate an instance tree which is, for the most part, isomorphic to the schema tree.

The schema analysis of the HLDSS specification language may be facilitated through the use of Lex and Yacc tools and is identical for both the source and target HLDSS. However, this does not account for the processing of the annotations and attributes of the HLDSS; this additional processing of the HLDSS files is different for the source 22 and target 24 and is the recognizer generator 36 for the source HLDSS and view generator 56 for the target HLDSS.

The annotations/attributes are processed in both cases to obtain information such as database and API interfaces, hosts and filenames. The data handling information is stored on the individual nodes of the schema trees and code is generated to access input data and produce output data. The stored information differs between the source and target, so as to distinguish between input schema trees and output schema trees. However, the two generators are logically similar and may be combined.

If the input HLDSS 22 refers to structured files, such as design files, for specially formatted data, then the recognizer generator 36 also produces yacc-like code that the parsing tool (Antlr/Pccts) can process. Antlr is an acronym for ANother Tool for Language Recognition which is part of Pccts (the Purdue Compiler Construction Tool Set). This tool generates the actual recognition/parsing module that is incorporated into the information bridge in a particular embodiment of the invention.

The above activities on HLDSS files are handled by the HLDSS parser. The HLDSS parser is called once to generate the code specific to the source HLDSS 22 and called (with different parameters) a second time to process the target HLDSS 24.

The HLTRS specification is sent to the transformer generator 42 which generates code files that describe the transformation rules in a form usable by the dependency graph 46 (See FIG. 4) which controls the data flow from source to target.

The system generation process next compiles the automatically generated code as well as some fixed template code which cannot be compiled before the specification code is created. Finally, the code is linked with the class library 44 and any other libraries that may be necessary to actually access data (e.g., the Oracle library, etc.). The output of generation module 30 is a mediator generator which forms the information bridge mediator 60 with mediator generator outputs 40, 50 and 58. Input data 62 is processed by the source recognizer 64 formed by recognizer generator 36, the transformer engine 66 formed by transformer generator 42 and the target builder 68 formed by view generator 56 to produce transformed target data 70.

Turning now to a more detailed description of the IA shown in FIG. 2, the high level data structure specification (HLDSS) consists of three parts and is used to describe the logical and physical structure of the source and target databases, data structures, file formats, and associated information. Separate HLDSS's are used for the different source 22 (input) and target 24 (output) data. If a data representation is used for input in some cases and output in other cases, then essentially the same HLDSS can be used for both.

The HLDSS specification language is uniform regardless of the diverse database, data structure, and file representations. The significant differences among these different data representations is accounted for by annotations on the HLDSS productions (statements). These annotations give rise to different specialized interpretations of each production, based upon the annotation. The uniformity of the HLDSS language foreshadows the uniformity of the internal intermediate representation of the actual data within the information mediator/bridge 60.

The three parts of the HLDSS are the grammar productions (the primary part) and the type and annotation descriptions.

Grammar productions specify the structure of the database, file format, or main memory data structures via a grammar-like set of extended BNF productions plus annotations. Each grammar production consists of:

Header: Component1 Component2 . . . {Annotation1}
Componenti: Componenti1 Componenti2 . . . {Annotation2}

The interpretation of these productions depends upon the optional annotations. If the annotation specifies "RDB:<database.handle>" then the production refers to a relational database table where the left hand side (LHS) of the production, e.g., 'Header', is the table name, and the right hand side (RHS) components are the attributes/ columns which are to be selected. Each application of this production to the input would produce one such tuple from the table. The annotation may optionally specify a full SQL query, and this production will then refer to the resulting virtual table.

If the annotation is "ODB:<database.handle>" then the production refers to an object from an object-oriented database. The LHS is the name of the object, and the RHS components are the attributes or methods whose values are to be selected. An explicit OSQL query may be specified instead, in which case, the result will be treated as a virtual object (LHS) having the component names designated by the RHS.

The key unifying idea here is that all databases and data representations revolve around several kinds of named aggregates of subcomponents. In turn, each aggregate may participate in one or more higher level aggregates.

The nature of the aggregations may differ from one data representation to another. In a unified approach, the different kinds of aggregations and data representations are distinguished through the use of annotations. Different kinds of aggregations include, for example:

1) A relation in which each record is an ordered tuple or aggregation of the attribute fields of that record,
2) An object which consists of the collection/aggregation of its attributes and methods,
3) A multi-valued attribute/method of an object in which the collection/aggregation is the set-valued attribute or the set returned by a method,
4) A structured file in which a record consists of a sequence or aggregation of fields, some of which may be named aggregates themselves, and
5) The repeating group and parent-child "set" of hierarchical models (e.g., IMS) and of Codasyl DBTG network models, in which the repeating instances or children are the aggregation associated with the parent node.

In all these cases, the approach uniformly treats the right hand side (RHS) of each production or statement as the components of the aggregate, and the name of the aggregate is given by the left hand side (LHS) of that production. Each instantiation of a production is treated as an instance of that kind of data aggregation. So for a relational database, the LHS names the relation (real or virtual/derived) and the RHS names the attribute fields. Then an instance of this production represents a relational data tuple.

The annotations on grammar productions are of the form "{<CategoryName>: <name>}", where <name> is just a reference to a subsequent line beginning with "Spec: <name>"—this serves to elaborate this annotation with further details. The CategoryName designates the primary category of the data source, and is selected from the top level of the taxonomy of heterogeneous data resources—which includes Relational DB, Object DB, File, URL, API, and DataStructure (i.e., main memory data structure).

In the example shown below, the annotation name 'Syb' appears on a line of the grammar productions and serves to identify the more detailed specifications that follow below, on the lines which begin with "Spec".

//Format of HLDSS:
//AggregateStructure:Component 1 Component2 . . . {Annotation}
//Type or Spec: data-objects or access-spec
Start: manifest+
manifest: header bound element+(numberofElements note+ (numberofNodes)
header: Name Version Type Fmt {RDB:Syb}
bound: numberOfElements numberOfNodes scaleX scale Y {ODB:Ont}
element: elementNumber nodeNumber+(8) {ODB:Ont}
node: nodeNumber xCoordinate yCoordinate {ODB:Ont}
Type String: Name Version Type Fmt
Type Integer: numberOfElements numberOfNodes elementNumber codeNumber
Type Float: scaleX scaleY xCoordinate uCoordinate
Spec Syb: {dbtype:sYBASE, nETWORK: @SITE1.COM:42}
Spec Ont: {DBTYPE:Ontos, OSQL:"Where $1.Mesh.name+$Name",
Network: @Site2.com}

This specification accesses a Sybase relational table named 'header' for attributes Name, Version, Type, and Fmt. It also accesses an ONTOS object database to obtain the 'bound' information from the 'Mesh' object whose Name was just obtained from the relational tuple. The 'element' and 'node' data are obtained from the same Mesh object. 'numberofElements' is the number of instances of 'element' data that occur for 'element+' and 'numberofNodes' is the number of instances for 'node+'. In turn, each 'element' has an elementNumber and eight nodeNumber data components, each of which is an integer.

On lines which start with "Spec <name>:" there follows additional information about the annotation. This consists of a sequence of "Keyword: value" entries, where for certain keywords the value may be optional. The set of allowed keywords depends upon the main category or phyla of the data resource. For example, the annotation "{RDB: Syb}" applies to the production whose left hand side is "header". RDB signifies the relational family of database types, and "Syb" names the annotation. The elaboration of "Spec: Syb" here identifies the relational DB as being Sybase, with the server at "@site1.com", and here port 42 is indicated, though usually the port is not needed.

Similarly, if the annotation is "ODB:<tag>" then the production refers to an object from an object-oriented database. The LHS is the name of the object, and the RHS components are the attributes or methods whose values are to be selected. An explicit OSQL query may be specified to qualify the objects of interest, and/or to limit the set of attributes/methods to be accessed—not all OODBs support such queries.

An annotation applies to all subordinate productions (i.e., expansions of the non-terminals on the right hand side of the production) unless productions for those non-terminals provide different annotations.

The HLDSS provides a specification language using a linear textual syntax consisting a sequence of lines of text. Corresponding to the HLDSS linear syntax, a graphical representation has been developed and is referred to as the logical structure diagram (LSD).

Referring again the FIG. 2, the HLDSS is parsed and processed by schema analyzers 32 and 52 to create annotated logical structure diagrams (LSDs) 34 and 54, each of which is a schematic structure graph (like a parse tree) that represents the schema and data structures of the data resources. Logical structure diagrams provide a form of meta-schema in that LSD's may be used to graphically describe different data models and schemas. The motivation for the LSD internal representation is that a context-independent uniform graph-based representation can represent all anticipated data resource schemata and structures. The context-dependent interpretation is dictated by annotations, which are processed by the HLDSS preprocessor and the recognizer generator 36 and view generator 56 modules.

Internally, the uniform LSD) structure represents aggregations (e.g. sets, hierarchically nested data, etc.) and associations (n-ary relationships, attributes, dependencies). Basically, the LSD consists of nodes and edges, where each node and edge logically may be associated with both an interpretation and a label, as described below. This interpretation does not change the uniform LSD structure, but rather enables us to see how the LSD corresponds or maps to (or from) the external heterogeneous formats and structures.

Thus the HLDSS is the surface syntax and the LSD is the general schematic conceptual structure which is used internally. Surface syntax other than the HLDSS could be utilized to create the schematic LSD initially. The graphical interface could be extended to support multiple specification paradigms.

The logical structure diagram provides a uniform representation over diverse schemata and structures, and it does this by logically separating the representation problem into three layers:

Syntax and structure of the LSD, which are independent of the data model representation.

Interpretation of the LSD relative to different data model formalisms, such as a relation, an attribute, an object, or a method which returns a value, etc. Such interpretations impact the meaning of the nodes and edges of the LSD.

Labeling of specific LSD components to correspond to named application schema components—including reference to attribute names, relationship names, and object names in the application schema.

These layers of syntax, interpretation, and labeling, enables the use of the same LSD syntax to represent very diverse data models and application schema.

The ability to define language constructs that can be applied to many types of data models and schemas, hinges on the ability to define different interpretations of such uniform constructs. Then the differences among schemas and data models can be encapsulated into such interpretations. Since a given information bridge may access data from multiple sources and/or produce data with multiple destinations, also attached to the LSD for convenience of processing, are the media-specific annotations that are part of the initial HLDSS specification.

The above three representation layers may be implemented in the following forms:

1) The descriptive representation language or formalism is the logical structure diagram. It is a logical graph (often a tree) of data entities and logical dependencies. The fact that this descriptive language is uniform in its logical structure depends on the ability to independently specify the interpretation and naming relative to different data models and different databases.

2) The choice of data model, as described in annotations, specifies interpretations such as: whether an association represent a relational table, or a relationship between two objects, or a relationship between an aggregate object and the members of the aggregate. These important differences are accounted for by the interpretation of the LSD constructs.

3) The particular schema: the names of the particular relations or objects, and/or attributes. These names are utilized in the components of the LSD.

More precisely, the logical structure diagram (LSD) is defined as a triple (N, E, I ), where N is a set of nodes, E is a set of edges over such nodes, and I is the interpretation of the nodes and edges relative to the data model and schema. Each edge $E_i$ is an tuple consisting of $k_{Ei}$ nodes from N and an optional edge label. The edge represents an association or relationship, and in general may be a hyperedge (thus making the LSD a hypergraph). Binary edges, that is, with two nodes plus an optional edge name also will be used.

The interpretation $I=(I_N, I_E)$ consists of two parts. $I_N$ is an interpretation over the nodes which partitions the node set N into subsets, each corresponding to a primary component type of the chosen data model (e.g., relation table names and attribute names). $I_E$ is an interpretation which partitions the edges so that a subset of edges contains a common set of node(s) from one partition of $I_N$ and this subset of edges relates these node(s) with nodes from a different partition of $I_N$. Thus the interpretation I represents and makes explicit the primary implicit relationships of the data model.

Thus for example, a relational data model would have an interpretation in an LSD where I consists of nodes which denote relation names, nodes which designate attribute names within the relations, and edges would connect relation nodes and attribute nodes. Similarly, an object model would designate nodes as object types, attributes, or methods, and edges would designate either: 1) a named relationship between an object type and one of its attributes, 2) a subtype (specialization) relationship between an object type and its parent object type, or 3) an aggregation relationship between an object type and its component object types.

Figure 3:
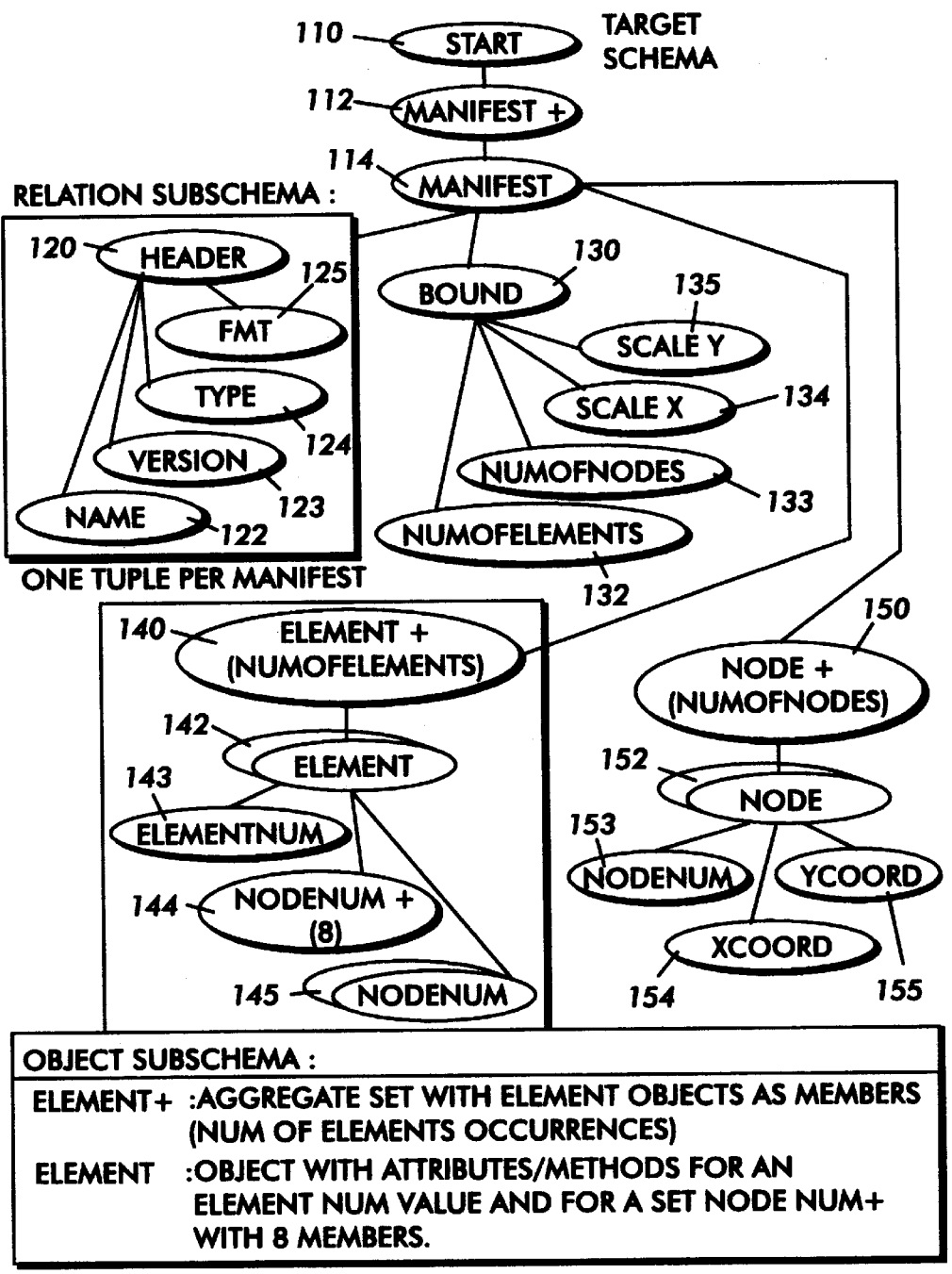
FIG. 3 shows a logical structure diagram.

An example of a logical structure diagram 200 is shown in FIG. 3 and corresponds to the following HLDSS productions:

Start (110): manifest+(112)
manifest (114): header (120) bound (130) element+ (numberof Elements) (140) node+(numberOf Nodes) (150)
header (120): Name (122) version (123) Type (124) Fmt (125){RDB: Syb}
bound (130): numberOfElements (132) numberOf Nodes (133) scaleX (134) scaleY (135) {PDB: Ont1}
element (142): elementNumber (143) nodeNumber+(8) (144) {ODB: Ont2}
node (152): nodeNumber (153) xCoordinate (154) yCoordinate (155) {ODB: Ont3}

The header tuple 120 represents data from a relational table while the data associated with the element object 140 comes from an object database—note that element represents a set or collection of element object instances. The sources of these and other data instances is described in the HLDSS specification.

Thus the logical structure diagram (LSD) is a uniform representation of the HLDSS specification and represents the schematic structure of the data. With the source and target annotations, the interpretation of the LSD describes the heterogeneous data resources. When looked at without the annotations, the LSD provides a uniform tree structured description of the intermediate data within the transformer of the Information Mediator. A directed cycle would arise when a data structure refers to itself recursively in its schema or definition. Multiple parents would arise when both parent nodes refer to a single physical shared substructure.

Since the intermediate internal structure of actual data mirrors the LSD schematic structure, the LSD instance tree or LSD parse tree reflects the actual structure of the data instances within the information bridge. The LSD schema and the LSD instances will be explicitly distinguished from each other only when this is not implied by context of the discussion. Thus the LSD provides a neutral data description language, which may be defined in graph-like terms utilizing nodes and edges, or may be defined in production-like terms in the HLDSS as just described.

Pattern matching can serve as a general paradigm for database access against object-oriented schemas, other data models, as well as for specialized design file structures. The approach is motivated by the observation that a query could be specified by a subgraph or subset of the database schema together with annotations designating the outputs and the selection predicates on certain components.

Database patterns can be seen as consisting of three aspects: (1) general pattern constructs, (2) data model specific constructs, and (3) reference to named components of a specific schema. As a result, the database patterns are applicable to object-oriented schemas and relational schemas as well as other data models. Queries may reference retrieval methods as well as explicitly stored attributes.

As a result, heterogeneous databases can be supported with capabilities such as: queries against data from different schemas, providing a uniform view over multiple databases, and providing different views for different users—e.g., with respect to a view commensurate with their local database.

A database pattern (DB pattern) may be defined in terms of selected components from the schema together with selection predicates. For an object-oriented database, the DB pattern will consist of objects, attributes and/or relationships from the schema, together with predicate qualifications to restrict the allowed data values and relationships. The restrictions may limit the combinations of data object instances which can successfully match the database pattern. Optional linking variables can be utilized to interrelate several data objects and their attributes.

When the DB pattern is applied against a database of instances, components in the pattern match or bind to data instances such that all conditions in the pattern are satisfied. The attribute and object names utilized in the pattern serve as implicit variables which are bound to these names.

The DB pattern may match multiple data instances. Some components of the pattern may serve only to restrict possible matches of other components that are to be produced in the result of the pattern match. Thus components which are to appear in the result are designated as output components of the pattern. Each different valid combination of instances for the output components constitutes a match instance. The DB pattern may be thought of as returning a collection of bindings for each combination of the output variables—such that each combination satisfies the DB pattern qualifications.

Database patterns provide the equivalents of selection, projection, and join. In addition they can provide recursion to obtain the closure of a relationship, as well as other constructs which are useful in non-relational schemas. The form of the patterns are based upon the structure of the schema, and thus such patterns are applicable not only to object oriented models but also to the relational model as well as more traditional hierarchical and network schemas.

A database pattern P is the ordered triple [ND,E,F], where ND is a set of node descriptors, each composed of a node $N_i$ and an optional predicate $P_i$. The collection of individual nodes Ni constitutes the set N. E is a set of edges defined in terms of nodes from N, as discussed below. F is the pattern's outform, which provides a generalization of the notion of projection. F can be utilized to specify structuring and organization of the resultant data instances.

An edge $E_i$ represents a relationship among nodes. In the general case, an edge is indicated by a tuple (N1, N2, . . . , θ, . . . , $N_{K-1}$, $N_K$) of nodes $N_i \in$ N, and thus may be a hyperedge. θ is an optional edge designator, which either may be an existing edge name, recursion over a given edge type, or a binary comparison function, such as a join condition. This general form of database pattern can be usefully treated as a hypergraph, in which some or all edges have k>2 nodes. When binary edges which consist of two nodes can be used, the database pattern P forms a graph.

The process of matching the pattern P against the database D treats the DB pattern P as a mapping (multi-valued function) which is applied to D to produce the match set M. This pattern matching process is denoted M=P(D). It produces a match set M which consists of all distinct outform/ output instances.

The basic definition of database patterns is independent of the data model and the schema because the distinction is made between the following (conceptual) phases in the creation and use of database patterns. These are:

1. Syntax and structure of database patterns, as defined above, which are independent of data model.
2. Interpretations of database patterns relative to different data model formalisms: object-oriented, relational, etc. This impacts the meaning or interpretation of nodes and edges.
3. Labeling of a specific database pattern relative to a given application schema—including reference to attribute, relationship, and object names in the application schema. This impacts the naming of the nodes and edges of the DB Pattern.
4. Application of the pattern, including binding of pattern variables based on matches, and return of matching instances from the database.

These database patterns provide a graphical representation for global queries, and thereby support transparency with regard to location and heterogeneity of distributed data.

The high level transformation rule specification (HLTRS) 23 consists of a set of condition-action transformation rules (sometimes also referred to as tree/graph rewrite rules). which are of the form:

Triggering-Conditions⇒Transformation-Function:: Result-label

The left side of a rule specifies the data objects on which the rule operates, the middle section of the rule specifies the action or transformation operation to be applied on each such input instance, and the right side specifies the label/name of an output form. Thus, an example of a transformation rule would be:

Token1, Token2⇒TransformFcn(Token1 Token2):: TokenOut

Each of these rules thus serves to coordinate and transform some input or intermediate data objects to other intermediate objects or output objects. In this way the rules are similar to a constraint-based description of the transformation process. The collection of rules comprises a data flow network which maps the input structure or schema to the output structure/schema. Execution of the rules in the information bridge then carries out the actual data transformations. A rule binds to and acts on each instance, or combination of instances if the left hand side of the rule consists of multiple components, of input data which satisfies its conditions.

The left hand side identifies 'trigger conditions' for an invocation of the rule. Specifically, it may be token name(s) which occur in the input HLDSS, or else the result-label of some intermediate data object produced by another such transformation/coordination rule. There may be multiple left side pre-condition labels for a transformation rule. The left side may include some additional constructs that serve as filter or guard predicates on execution of the rule. The transformation action represents a functional application, and usually makes reference to a library of transformation operators, though it can include code fragments, much in the same spirit that Yacc and Lex admit code fragments within each production. The parameters to the function come from the data objects whose labels appear on the left side of the rule.

When there is a new data instance for each of these tokens on the left, the rule is triggered. The resulting value or subtree instance produced by the rule is then given the output label that is designated on the right side of the rule specification. Specifically, the right side of a rule may be a simple data element or a complex data structure represented by a subtree. That is, the right side may be the label of any terminal node or the 'root' of any subtree/subgraph of the output HLDSS, or any intermediate data object that is to be utilized by another rewrite rule. Note that each label of the input schema tree must be distinct so that this designation is unambiguous. This is facilitated by adding a suffix to components of the HLDSS which otherwise would have the same label.

Each rule is implicitly iterated for each distinct combination of data object instances which satisfy the conditions on the left side. Thus multiple object labels occurring on the left side may give rise to a cross-product of data instances, each of which invokes the transformation. Alternatively, a vector-dot product of the instances corresponding to each of the multiple labels on the left hand side may be specified. The conditions and operations (modifiers) which may be used on the left hand side of transformation rule are described below in reference to the virtual parent concept.

Some of the transformation operators provide rearrangement of data objects (e.g., permutation), aggregation of objects which satisfy a given criteria into a collection, and the reverse process of separating a collection into individual objects. Other operators iteratively apply a function to each member of a subtree (a collection is a special case), as well as operators which are a generalization of relational selection, projection, and join. There are also set operations, including cross-product and dot product of sets. Such sets are actually bags since duplicates are allowed by default unless explicitly removed.

Normally each invocation of the transformation produces one data object—which may be complex and consist of substructure. However, the Collect operator collects multiple data objects and produces an ordered bag (a sequence) of data objects, where the relative collection point is either explicitly specified or else is the common parent (relative to the input grammar) of the multiple left hand side data objects. In contrast, the Each operator takes a single compound data object and produces multiple outputs, one for each top level member of the compound data object.

One of the important aspects of the internal representation of the invention is that it supports not only tree manipulation and tree rewriting operations, but also the application of extended relational operators. Consider that for each subtree in the LSD) schema tree where the subtree root is designated as a collection (with "+" or "*" to designate multiple occurrences), a collection of subtree instances is in the instance tree. A tree rewrite operation that is to be applied to this subtree can be iterated over each subtree instance.

Alternatively, the first level children of a subtree may be treated as the (possibly complex) attributes in an n-ary tuple whose degree is the number of such children (as defined in the schema tree). Then the set of such instance subtrees can be seen to correspond to a set of tuples, with the label of the subtree corresponding to the name of a (virtual) relation. The operator is applied to each subtree instance, which corresponds to a tuple consisting of (possibly complex) first-level components. Extended relational operators thus can operate on each subtree instance by treating it in this way as a tuple. Note that the component of such a tuple may be complex, in that it may itself be a subtree, in which case a nested relational representation is being manipulated.

Thus both the extended relational operators and the tree manipulation operators are applicable. Since a transformation is applied to each subtree instance, the alternate interpretations as either a set of tuples or a set of subtrees are dependent upon the application and the type of transformation rule.

Some of the transformation operators which are in transform library 44 will now be described. The partial list begins with general tree and sequence rewriting operations, and then describes extended relational operators.

Note that a transformation operator is iteratively (or in parallel) applied to each subtree instance. The appropriate subtree is indicated by the label on the left side of the transformation rule. Each result produced by the operator is given the label from the right side of the transformation rule. Operators discussed below which take a label as an argument use such a label internal to their processing, e.g., to relabel internal subtrees, for example.

The two sets of operators for tree manipulation operators and extended relational operators are described in turn. Following that, the aggregation and disaggregation operators are described—which are utilized as modifiers on the left hand side of transformation rules, as needed. Iterate and rewrite manipulation operators include:

Iterate(AggregateIn, Pred, ApplyFcn, NewLabel)
Rewrite(AggregateIn, Pred, ApplyFcn)

These operators explicitly take advantage of the tree-like structure of the internal representation—which is essentially isomorphic to the LSD as described earlier.

Both operators walk the given input tree/sequence via postorder traversal (root visited last), applying a function ApplyFcn to each node where the given predicate Pred is true. Iterate returns a collection of labeled list values from the non-null function applications. Pred may be a user supplied predicate, or it may be an integer, a label name, or a list of label names. When Pred is a positive integer i, this means that the condition is satisfied only at level i of the tree, where the root is level 0. If Pred is a label or a string of labels, the condition is true at a node of the tree if the node's name matches the label or one of the labels in the list. When Pred is false at a visited node the ApplyFcn is not invoked, but traversal continues into the interior nodes of its subtree.

For the Iterate operator, if NewLabel is non-null, then each value returned by ApplyFcn is given this label, thus the result is a set of instances with this label—this set can be viewed as a one level tree or it can be viewed as a relation with each such returned instance being a 'tuple'—with the relation name appended as a label to each such tuple.

The rewrite operator is more general in that it allows rewriting and transformation of the input tree/sequence into a more general output tree. Rewrite builds its output as a hierarchical tree-like structure by copying its AggregateIn structure, subject to local rewrites at each node. Pred is treated the same as for the Iterate operator.

For the Rewrite operation, if ApplyFcn returns False the visited node is not copied; if it returns True, then the current node is copied as is. If ApplyFcn returns another value, then it is taken as the value to which this node has been rewritten, and thus replaces this visited node in the output of this Rewrite operator. In general, the result for the Rewrite operator is a tree structure which is a projection of the structure of the original tree (i.e., some nodes may be omitted). The values for nodes of the rewritten tree may be transformed values or copies of the corresponding node of the original tree.

Extended relational operators include the following project/permute operators:

Project(Permutation, SubTreeLabel)

Permute(Permutation, SubTreeLabel)

This operator permutes the top level members of each subtree instance having the designated SubTreeLabel according to the specified Permutation order. The i-th entry in the Permutation order specifies the relative index of the initial entry which is to occur in the i-th position of the result. This may include repetition of members.

The operator can be viewed in either of three related ways. It may be viewed as the traditional relational operator "project", in that each instance to which it is applied can be viewed as a tuple (possibly complex) of the relation named by the second argument; it thus provides relational projection onto the designated columns of the tuple. Alternatively, it may be viewed as SelectByPosition, since it selects the components of the LabeledSubTree according to the indices given in the first argument. Or it may be viewed as a permutation, since it rearranges each first level sequence or subtree of the second argument—it is iteratively applied to each such subtree instance at that level. These interpretations are equivalent operationally, but the interpretation is relative to how the user or integration administrator is viewing the data. Thus there are synonyms for this operator as Project or Permute.

SelectByMatch operator follows:

SelectByMatch(selection_keys, i, relation)

This function selects those tuples from the input relation for which the value of the i-th attribute matches with one of the attribute values specified in the selection_keys. The output from this function is a relation or set consisting of the tuples or subtrees which satisfy the above condition. This rule has some similarity to relational selection, but it focuses more on manipulation of the first level children of each subtree instance.

Extended relational join operators are of the form:

Join (left_relation, right_relation, left_attrib_list, right_attrib_list)

This transformation operator interprets the uniform internal LSD instance tree so that relational join operations are meaningful and easily carried out. The left_relation and right_relation arguments specify the LSD subtrees each of whose instances are treated as relational tuples consisting of the first level children in that subtree instance. This operation is applied to the collected set of instances of the left and right relations. The two attrib_lists indicate which positional attributes/components of the left and right 'tuples' are to participate in the equality-based natural join operation.

This comparison operation treats complex attributes (i.e. those with substructure) in terms of structure identity as the basis of equality matching. In effect this means that pointers may be compared without recursively descending the substructures. The implementation utilizes a hash join approach where a hash index is created for the tuples from the left relation based on its join key values, thereby reducing the potentially quadratic nature of a loop join into a process which is linear in the number of tuples.

PredJoin(left_relation, right_relation, left_attrib_list, right_attrib_list, pred_function)

This PredJoin operator is an extension of the above Join operation. It extends the notion of join from equality matching as the join condition to testing of a user provided pred_function. This will fully accommodate less-than and greater-than joins as well as other join conditions. This operation is more costly because the hash join approach is not applicable for an arbitrary predicate comparison of the join keys.

JoinOuter(left_rel, right_rel, left_attribs, right_attribs, outer_choice)

PredJoinOuter(left_rel, right_rel, left_attribs, right_attribs, pred_fcn, outer_choice);

These two functions extend the prior join operations with the three outer join options, of LEFT, RIGHT, FULL, meaning retain unmatched left tuples, or retain unmatched right side tuples, or retain all unmatched tuples from either side. All the tuples actually are represented as LSD instance trees, since they may include complex substructure for the attribute components.

Grouping and ungrouping criteria for collecting input instances into subsets and for iterating over subsets are referred to as aggregation and disaggregation modifiers for the LHS (left hand side). The result of an aggregation is a partition of the instances, where each partition subset has a common value for the grouping criteria. This is analogous to the GroupBy clause of an SQL query, but is generalized to apply to tree structured data.

A virtual parent, relative to the input tree, can be defined as a means of providing grouping criteria on the left side of a transformation rule. This virtual parent may be the direct parent of the data collection, or it may be a prior ancestor of the direct parent—in the latter case, the collection includes a larger scope of data. This criteria serves to modify the transformation rule to act on the appropriate collection of data instances. Disaggregation operators can also be provided for the transformation rule.

The virtual parent is designated in the transformation rules below by an UpTo(ancestor) clause on the left hand side of a rule. If the UpTo clause is specified without an argument, then the default is to utilize the grouping of data relative to a common parent of the input. If all the LHS data has a common direct parent, it is used as the virtual parent. If the LHS data references span more than one parent label, then the default virtual parent is taken to be the closest ancestor, from the input tree, which is common to all member instances of the collection. An explicit virtual parent can be specified to be a higher level ancestor.

These LHS operators are optional, and when used serve as modifiers to the condition on the left hand side of the transformation rule.

A Collect operator allows for grouping a set of data instances relative to a common criteria. The Collect operator appears in a separate rule and must have an UpTo clause on the left side of the rule; the form is:

Token1 UpTo (virtual parent) ⇒Collect (Token1) :: TokenOut

This rule will collect instances of Token1 into a collection which will then be given the label designated on the right side of the rule. Only one token type may appear on the left side of the rule. All instances of Token1 under a single instance of the virtual parent will be grouped into the same collection. If the virtual parent in the UpTo clause is omitted, then the nearest ancestor to Token1 which is an aggregate "plus" node, or the root, is taken to be the virtual parent. The completion signal for this Collect rule is the input instance tree node for the virtual parent.

An Each operator can be thought of as the inverse of the Collect operator. The form is:

CollectionToken ⇒Each (Token1) :: TokensOut

This rule takes on the left side a label which represents one collection and produces multiple outputs, one output for each member of the collection. The input CollectionToken is consumed only when the last member of the collection is processed. As for the Collect operator, only one token type may appear on the left side of the rule.

The Merge operator combines several different input tokens from the left side into one sequence which is then passed to the body of the transformation rule. The result is a single instance, which is given the label on the right side of the rule. The form is:

Merge (T1, T2, T3) ⇒TransformFunction ($1) :: TokenOut

The TransformFunction may be any transformation taking one argument which is a sequence or list of elements. The $1 represents the first component from the left side, which here is the result of the Merge operator.

The Expand operator is the reverse of the Merge operator. Expand takes a single argument which is sequence or list and treats the first element of that sequence as the first argument to the TransformFunction, and so on. Its form is:

Expand (Token) ⇒Transformlunction ($1, $2, $3) :: TokenOut

Note that the Expand operator produces one result token—the result of applying the TransformFunction. This is different from the Each operator which produces multiple outputs.

The cross product takes multiple inputs on the left hand side of the rule and is distinguished by the * separating these inputs. This rule has two forms, the first is:

Token1 * Token2 * Token3 UpTo(VP) ⇒TransformFunction ($1, $2, $3) :: TokenOut

Here VP represents a virtual parent of the input sets—this must be a common ancestor of Token1, Token2, and Token3.

The cross product rule first performs an implicit Collect of all instances of type Token1 to form a set which is called Token1+. Similarly, an implicit Collect is performed for Token2 and Token3 arguments.

If the virtual parent in the UpTo clause is not specified explicitly, then it defaults to the closest common ancestor of these input types, relative to the input instance tree. Recall that the common ancestor of derived data refers transitively to its origins in the input instance tree.

The Cross Product then applies the TransformFunction separately to each combination of instances from each of these collected input sets: Token1+, Token2+, and Token3+. The CrossProduct collects these results to produce one output sequence, which consists of the sequence of results arising from every Cross-Product combination. The CrossProduct is a predefined operator and can take an arbitrary number of input argument types.

The second form of the cross product rule simply omits the UpTo clause, which changes the meaning of the rule just to the extent that no implicit Collect is performed for the left hand side tokens—the * serves to designate the rule as a cross product. In this case, each of the left hand side token arguments is then taken to already represent a set, as may occur if a left side argument was a Node+ from the input tree or if the data has already been processed by an explicit Collect rule. The cross product then proceeds as before, applying the TransformFunction to each combination of values from the input collections—duplicates are not eliminated.

The inner product is similar to the second form of the cross product in that it takes multiple left hand sides tokens which each represent collections—except that these arguments are now treated as being ordered, and thus are sequences. The form of this rule is:

Token1 . Token2 . Token3⇒Transformlunction ($1) :: TokenOut

The dot or period designates the inner product instead of the * for cross product. The first element from each of the input sequences are paired to form the first tuple or vector of data to which the TransformFunction is applied. Then the TransformFunction is applied to the second tuple of data formed from the second component of each sequence represented on the left hand side of the rule. The output consists of a single sequence arising from each application of the Transform Function.

Figure 4:
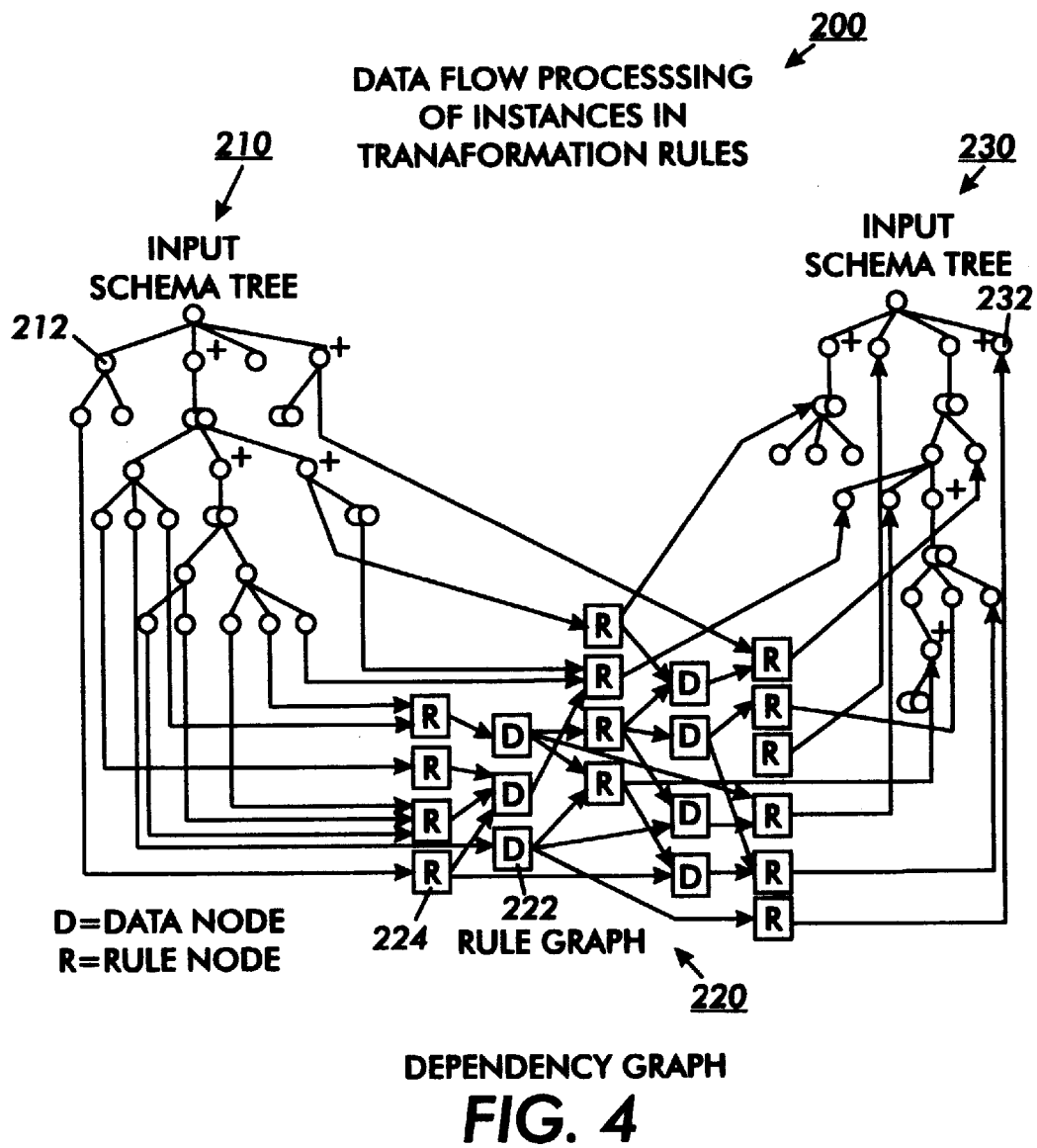
FIG. 4 shows a dependency graph.

The dependency graph 200 shown in FIG. 4 is the basis for rule execution. It is implemented as a high level abstract class for the information bridge. It is composed of three submodules for the input tree 210, rule graph 220, and output tree 230, respectively. Although the term tree is used, the input and output actually may be cyclic directed graphs, though they most often are trees. Non-tree structures arise when two or more leaf nodes are identical (corresponding to multiple parents) or when there is a directed cycle representing a recursive structure, such as the contains or part-of relationships that arises in applications such as bill of materials. These three submodules are linked together to form the actual dependency graph data structure and associated functions, as shown in FIG. 4. The input tree feeds into the rule graph which feeds into the output tree.

The input tree 210 actually consists of both a schema tree and an instance tree. The input schema tree is constructed automatically from the input HLDSS and includes accessor functions which will retrieve and, if necessary, parse input data from multiple input sources. A node 212 in the schema tree represents a named type of data element, much as an attribute in a relational schema defines a component of each tuple. There also may be specific aggregation node(s) in a schema tree which represent a set, collection, or aggregation of subcomponents. Thus a roster may represent the set of students taking a course, or a database relation name may represent the set of tuples which populate that relation table.

When the accessor functions retrieve data instances, they build an instance tree which has the same logical structure as the schema tree, but now with potentially multiple instances nodes for those schema nodes which are subordinate to an aggregation node in the tree. There would be one input instance aggregate node for each occurrence of a collection—say each course—and one data node for each member of an aggregate (e.g. each student). Similarly, to represent a relation in a relational database, there would be a separate schema node for the relation itself, for a generic tuple, and for each attribute type. In the instance tree there would be as many tuple nodes as there are tuples, and each tuple would have one instance node for the value of each attribute of the relation Input data instances are first inserted into the input tree. The data instances are then passed by the input tree to the rule graph, together with completion signals. The rule graph 220 will apply specified transformation rules on the data instances to generate intermediate instances and output instances. The final rules of the rule graph insert the output instances into the output tree 230 which assembles and eventually outputs them accordingly. Thus dependency graph 200 forms the implementation structure which enables data driven processing of the input data instances.

This processing is asynchronous and thus is amenable to parallel processing. Intermediate data tokens arising in the rule graph are released as soon as they are no longer needed. Elements of the input instance tree also could be released once all their dependencies have been processed.

The asynchronous processing is supported by two major dependency coordination schemes in the dependency graph: (1) The blocking and unblocking scheme in the rule graph and in the output tree, and (2) a completion signal scheme. Currently input data instances can continue to be acquired even when the rules they feed are blocked—this could be changed easily to conserve intermediate memory if desired.

The rule graph 220 is a directed graph and consists of two types of nodes—(intermediate) data nodes 222 and rule nodes 224. Each rule node is connected to one or more input data nodes and no more than one output data node. Several rules may interact in that the output of one or more rules may feed the input to one or more other rules, as shown in FIG. 4. This is consistent with the fact that each HLTRS rule (rule node) can have multiple input labels/data and at most one output label (for one data node). Multiple other rules may utilize this rule's output, and this is accomplished by having a data node feed multiple HLTRS rules (rule nodes).

The left-most data nodes in the rule graph are connected to input schema nodes of the input tree. The right-most rule nodes in the rule graph are connected to the output schema node in the output tree. The rule graph thus is a part of the data flow diagram in the dependency network.

A blocking and unblocking scheme is used to ensure a smooth and proper flow (i.e., no overflow) of data instances in the rule graph. Each rule has a one queue for each of the rule's inputs. When the rule is fired and it creates output, the rule is blocked until the output is consumed by another rule or by the output tree—in the case of a collect rule, discussed below, the rule does not produce its output until the collection is completed. The implementation considers a rule blocked when its output node is blocked, which indicates that the result produced by the previous execution of the rule has not yet been consumed.

Once the rule is unblocked, the rule may be triggered again when there is at least one data element in each of its input queues. A rule is considered activated once it has been triggered and before it has completed execution. Activated rules are appended to a working list of activated rules, and can be executed in the order in which they were activated. The activated rules could also be executed in parallel on a multiple processor platform.

When a rule is executed it utilizes one data instance from each of its input queues. The implementation utilizes one physical queue for each rule's output. This queue may feed one or more other rules—in the latter case, all the consumer rules have logical queue pointers into this one physical queue. The rule creating this output is considered unblocked when any of the logical queues of subsequent rules is empty. The actual data instance is removed from the physical queue only when all logical queues have utilized this data instance.

The output tree 230 actually consists of both an output schema tree and an output instance tree—this is similar to the input tree. The output instance tree may have potentially multiple output instance nodes 232 corresponding to a given schema node.

Rule nodes may feed output schema nodes and/or other rule nodes. As instances pass from these rule nodes to the output schema nodes, each schema node is responsible for creating new output instance nodes and inserting them properly in the output instance tree. If the data instances are atomic then they are inserted into leaf nodes in the output instance tree—the relevant parent and ancestor nodes are created automatically. Alternatively, rules may process and produce sets as well as data instances with substructure, in which case such non-atomic data may be inserted as a subtree in the output instance tree.

Transformations may be expressed as a set of transformation rules—though in the limiting case, one rule could produce the full output tree. A transformation rule or a chain (composition) of transformation rules establishes a correspondence or mapping from one or more leaves and subtrees of the input to one or more leaves or subtrees of the output instance tree.

There also is a blocking and unblocking scheme on the output tree, and this is coordinated with the rule graph. Blocking/unblocking on the output schema nodes will cause blocking/unblocking on the rule nodes in the rule graph.

In the output tree the blocking and unblocking scheme serves two related purposes:

An output instance subtree with distinct children nodes must be completed before output data is inserted for the next instance of that subtree. This is ensured by blocking introduction of new instances of a different subtree (i.e. having a different subtree root) until all components of the current subtree are complete. When all member instances are present the current subtree is marked complete. This unblocks the subtree root for creation of another subtree instance, and the children in that new subtree then may receive output data. As an example, a new relational tuple cannot be started until the previous tuple's data is completed.

A data collection/set/aggregate must be complete before processing data for the next occurrence of this data aggregate—this is somewhat similar to the first case, but here it is referred to as a set of data in which there may be one schema node type representing the multiple instances in the set. The criteria is enforced by building a dependency relation between the aggregate schema node and the schema node representing members of the aggregate. Creation of a new aggregate is blocked until all instances of that set are complete—as determined by the completion signal scheme.

The subsequent material describes the generalized GroupBy criteria, cross product rules, and some of the other generalizations of nested relational operators that have been developed for data integration. It also goes into greater detail regarding the signaling conditions which help to implement the above subtree and set completion criteria.

The completion signal scheme augments the blocking and unblocking of rules and is used to determine when a set or collection of data is complete. Two different cases arise. A parent node may have several distinct children nodes, each having its own different label. That parent node and its set of children are considered complete when there is an instance for each child node. Subsequent instances would be associated with a different parent.

The second case arises when an input or output tree node has an explicit set indicator, which is referred to as a "plus" node in the HLDSS because the syntax is Node+. This represents the parent node of the set or collection, and the type of the children which are the members of the set are indicated by a schema node labeled Node (without the 'plus'). The Collect and Product operators in transformation rules depend on knowing when their input sets are complete. The output tree also depends on knowing when any output nodes representing a set or collection (i.e. designated as "plus" nodes) are complete.

To determine such completion a logical association is made with each data instance in the input tree of a list of the instance nodes of all its ancestors. For each set or collection operator in the rule graph, and each set or collection node in the output tree, one of these ancestors is selected as a virtual parent. The virtual parent provides the basis for the collection. In general, the virtual parent is the closest ancestor common to all the member instances.

When it is determined that a collection is complete, designated member instance nodes relative to one instance of the virtual parent are collected. The next instance of the virtual parent, if any, provides the basis for the next instance of the collection. In effect the virtual parent serves as a delimiter or boundary between different collections of instances. For data derived in the rule graph, the virtual parent refers transitively to the common virtual parent of all the data instances from the input instance tree that gave rise to the derivation of this data.

The virtual parent is designated in the transformation rules below by an UpTo(ancestor) clause on the left hand side of a rule, as noted earlier. The virtual parent serves as a form of generalized GroupBy criteria. If the UpTo clause is specified without an argument, then the default is to retain the grouping of data from the input. That is, the default virtual parent is taken to be the closest ancestor from the input tree which is common to all member instances of the collection or set.

This analysis is done during code generation for the information bridge, where the dependency graph is preanalyzed to determine which ancestors are needed. Furthermore, in the implementation each data instance with its relevant ancestors is not directly annotated, rather it is created as a separate virtual or invisible data node for each instance of these virtual parent ancestors. Each such virtual data node is referred to as a completion signal and it is propagated through the rule graph to the output tree. Thus when a collection of input data is complete, a signal representing the parent of that collection is inserted in the dependency network after its set of data.

During the analysis phase, code is inserted in the relevant rules and output schema nodes to detect the signals which are needed. Rule graph nodes also filter out multiple occurrences of the same signal, such as may arise when a rule has multiple inputs. Only the last such duplicate signal is propagated onward. The number of duplicate signals is determined during analysis time and this count is used to determine the last duplicate.

A more detailed discussion regarding the parsing and recognition of heterogeneous data resources will now be addressed. Such parsing and recognition of source data are accomplished by code modules, which in some cases consist of generated code that is created by the earlier modules of the system. Specifically, the HLDSS preprocessor, which parses and interprets the HLDSS specification, is responsible for generating such code and tailoring it to the annotations given in the HLDSS.

This code generation process creates the LSD schema tree and the modules (e.g., parsers) which access data and build the LSD instance tree. This generated code also performs the necessary data conversions from the external form to the internal values—as dictated by the Type specifications which are also part of the full HLDSS (not shown in FIG. 3).

FIG. 3 shows a logical structure diagram which accesses different data resources. The multiple overlapping ovals surrounding nodes marked with a "+" signify that multiple data instances correspond to this node for a single parent instance.

The nodes of the LSD are annotated with the annotations that are given in the HLDSS, together with derived annotations that are determined during processing. One important category of derived annotations is that of uniform regions, discussed below, which determines the access and parsing/generation of data.

The schema tree represents the logical structure of the data. The structure of the schema tree, specifically the parent/child/sibling relations, are represented by the productions in the HLDSS file. The right-hand side elements of a production are children of the left-hand side. And that left-hand side, in turn, is a child of the production in which it appears as a right-hand side. All elements that appear together on the right-hand side of a production are siblings.

The type specifications, specifically integer, float and string, describe the data types of the actual instance data. The annotations and spec lines describe details of how the data is stored. Note that this is independent of the structure of the schema tree. A given schema tree can map back to data that is stored in very different ways, like a flat file, a web page, a relational database or an object oriented database, but share the same logical structure, by the use of different annotations for the input and output.

How the schema tree is actually built will now be described. The schema tree consists of "schema nodes," where each node corresponds to a right-hand side element in an HLDSS production. An example of part of an HLDSS specification is given earlier when discussing FIG. 3.

Each node has attributes such as a label and a node type. The node's label is determined by the corresponding element name in the HLDSS file. For terminal nodes, their type corresponds to the type of their data, i.e., string, float, integer, etc. for non-terminal nodes, their type describes what kind of non-terminal it is. Non-terminal nodes can either be left-hand side nodes, or "plus" nodes.

Multiple instances of a data type, such as multiple rows of a database table, in which each row has the same format, are specified by using the extended BNF plus ("+") operator to indicate "one or more occurrences" of that node. Manifest 112, element 140, and node 150 which appear in FIG. 3 are three examples of plus nodes. The number of instances of a "+" node can be optionally specified, either as a fixed constant or arithmetic expression, or it can be specified by a variable in the HLDSS file, such as element and node in the previous example. If no bound is specified, then the node type is recursive.

In generating the schema tree for the information bridge, each non-terminal that appears on the left-hand side of a production in the HLDSS file gives rise to a corresponding non-terminal node in the schema tree. The children of that rule-node are all of the nodes that appear on the right-hand side of the aforementioned production. Any of these right-hand side nodes that are non-terminals appear as the left-hand side of another production. This process proceeds recursively.

The motivation behind this two step code generation and compilation process basically is the distinction between analysis (code generation) and execution. If an interpreted language such as Lisp or Smalltalk is used, then the operation distinction between these phases would not be as noticeable, as an interpreted language can both analyze and generate code and then proceed to execute that code all in the same process.

For the two step code system, the first phase analyzes the HLDSS and creates the description of the LSD schema tree and the necessary data structures. The second phase utilizes the description that was generated in the first phase to actually construct the data structures in the executing information bridge process. This represents two distinct processing phases, specifically the "bridge generation" and "bridge execution" times, respectively. Since C (and C++) are compiled languages, they necessitate a separation of these phases. Interpreted languages, such as Lisp, TCL/TK or Perl provide an "eval' operator that allows (source) code generated by a program to be interpreted and executed by the program that created it.

There are two viable alternative solutions when using a language that does not provide such a facility. The first is to create an internal language and interpreter for the intermediate representation and use that for the description and interpretation. The drawback of this approach is that the internal representation is limited by the language that is created to describe it. As system requirements change or expand, this representation, as well as the interpreter, must be changed to allow new features to be added. The second option is to generate code in an existing language, compile the code, and then execute it. The draw back is that it requires a separate compilation and execution phases, which represent separate processes. However, the benefit is that since the generated code is the same language as the generator (C++ in this case), it can be directly used and has all the expressive power of the underlying language (C++).

The HLDSS parser generates C++ code, which is then compiled in the first phase. The compiled code, when executed, creates the actual data structures for the schema and instance trees when the information bridge is executed in the second phase.

A uniform region is essentially a contiguous set of data from a common data source such that it is uniformly parsable, e.g., tuples from database relations, or binary data from a file.

More formally, a uniform region is defined as a complete subtree or subgraph within the logical structure diagram, all of whose terminal nodes are uniformly parsable and from a single data source, and such that there is no larger containing complete subtree/subgraph which qualifies as a uniform region. Terminal nodes correspond to actual data, and non-terminal nodes correspond to structures and aggregates.

When there is shared or recursive substructure, the LSD schema becomes a more general graph rather than a tree due to multiple parent nodes and/or cyclic references.

A subtree is complete if there is a unique node which serves as a root, and such that the subtree includes all and only those nodes reachable from the root via the directed edges. A subgraph is complete if it contains a complete subtree which spans all the nodes of the subgraph.

Uniform regions partition the set of terminal nodes, and thus the set of actual data, into homogeneous subsets, each of which may be accessed by a single access mechanism and parser/recognizer. Shared substructure is represented by an LSD instance subgraph which has two or more parent nodes. If the LSD schema graph is cyclic, this represents a recursively defined data structure. The corresponding LSD instance graph need not have such cycles since each component could be represented by a separate copy of its instance subgraph—unless the instance data is also shared. Thus multiply referenced substructure in the LSD schema graph does not automatically imply shared substructure in the LSD instance graph—it is just the potential for sharing which is indicated by an explicit annotation in the HLDSS and in the LSD schema graph.

Thus a uniform region is a complete subtree or subgraph corresponding to data from a single data source—such as a relational DB or object DB. A structured file may consist of different uniform regions if, for example, portions of the file are delimited ASCII strings, and other parts are binary data.

Note that a subtree is not uniform if any of its terminal nodes is from a different data resource than any other terminal node of that subtree/graph. Thus two or more adjacent subtrees of a common parent may be from the same data resource, but need not be part of a single common region if another descendent of the common parent of these subtrees is from a different source. In the latter case, some optimizations are possible when two or more uniform regions of the same type are adjacent in the LSD.

An individual or atomic field, relative to its data source, may have further decomposition specified for it by the HLDSS. As an example, in a relational database, if a field is a binary large object, then it would appear as a single atomic field in the relational tuple, but it may have further substructure and thus would be decomposable by additional parsing. This would be indicated by an explicit annotation on the production that defines the substructure of that field, indicating the substructure to be applied—this may be text parsing of a comment, or binary data parsing of graphic or video data, for example. This would not change the nature of the containing uniform region (i.e., as a relational database region) since the data comes from the same data source and the substructure is of a single data component or field value.

In the system, the term 'parser' is used more generally than when parsing text or languages, since it can mean data access involving structure decomposition (one might say structural parsing) and the conversion of raw external data (e.g. ASCII and binary data) into internal data values such as integers, reals, text, etc. A distinct data access function or 'parser' is associated with each uniform region. If data is from two different files, it is easy to see that two different parsers may be appropriate, especially if the files have different data formats.

Parsers can be organized as object types according to the taxonomy of data resource types. An instance of a parser object type is associated with a specific uniform region in the LSD schema. That parser instance is activated whenever data from that uniform region is to be accessed or created.

Different uniform regions will have different instances of the same parser object type when these regions have the same type of data source and same type of data representation— e.g. objects in an object database. Utilizing different parser object instances, even of the same type, captures the possible differences in data sources (e.g., two different ASCII files) and the different states those parser object instances may be in when (an occurrence of) their region is complete.

Thus a given uniform region is characterized by a data source, a parser type, and a parser object instance; and this information is attached to the unique node in the LSD schema tree/graph which is the root of this uniform region.

The process of determining uniform regions and associated parsers for the LSD tree (or graph) serves to cover all terminal nodes with distinct parsers. The root or distinguished node of each uniform region now has a parser method associated with it which can recognize (or create) data in that region.

All nodes which are outside some uniform region are designated as parser controller (PC) nodes. These nodes are parents of either uniform regions and/or other parser controller nodes. Whereas the behavior of each parser method is specific to the data source and data format of its uniform region, the parser controller process is general and may be invoked as a reentrant procedure for each PC node in the LSD.

So far the schema of the LSD have been described. Corresponding to each node of this LSD schema, there will be several instance nodes, all being instances of this type of LSD schema node. For the root nodes of uniform regions, each associated instance node represents a different instance or occurrence of this uniform region in the actual data.

The instance nodes taken together form the LSD instance subtree/subgraph. Another interesting way of thinking about the LSD schema tree is that it provides a kind of pattern which is matched against the structured data. As such matching proceeds, instance structures are assembled in accordance with the structure of this pattern—when taken together, these instances form the LSD instance subgraph.

The operation of the parser and parser controller nodes during data access will now be addressed. The process is described sequentially, although the process is designed to support parallel execution, subject to data dependencies.

The data access and parsing process begins with the top or maximal node of the Logical Structure Diagram—if the LSD is a tree, this is the natural root; if the LSD is a graph, then this is a designated node such that all other nodes of the LSD are reachable as descendants of this node.

Each child node then is visited in turn, proceeding from left to right for sequential processing. Parallel execution would be supported by processing independent subtrees in parallel. Limited dependencies between subtrees could be approached by message passing between the respective parallel processes for these regions.

Each child node that is visited is either a parser controller (PC) node or is the root of a uniform region. Each PC node in turn visits its immediate children in left to right order, and each returns a data structure which represents a corresponding data instance tree. The parser controller assembles these instance subtrees from its children into an instance tree for this PC node. When all its children have been processed, this tree is returned to the caller of the PC node.

This process is the same for all parser controller nodes, except that the top node of the LSD returns its instance tree for subsequent processing. If the LSD schema has cycles, each cycle is treated as recursive invocation of the subgraph pattern as the basis for parsing, until the data is exhausted.

In principle, a uniform region could be as small as a single terminal node, or as large as the whole LSD.

Thus the execution of the parser controller nodes provides the postorder traversal of the tree down to the level of uniform regions. Then the associated parser for the particular type of uniform region is invoked. It traverses the nodes of the uniform region, and constructs a corresponding instance subtree/subgraph. The uniform region parsers typically are specialized, and interpret the LSD schema tree relative to the specific annotations of that region. The nodes and edges may be treated differently in different regions, and even different edges and nodes within a region may have different meanings based upon the annotations. In contrast, each parser controller node treats its immediate descendants uniformly, and this applies recursively downward until a uniform region or terminal node is encountered.

The operation of specific types of uniform region data access functions, referred to as parsers will now be addressed. All relational database parsers share substantial functionality, and this is accomplished by the definition of a relational parser object type. Then specific relational databases are handled by creating associated parser object subtypes, such as for Oracle, Sybase, and Informix database products.

The methods associated with the relational parser object type include: 1) connecting to the database server, 2) opening the database, 3) issuing the query and opening the associated virtual or actual relation (the result of a query which joins relations is a virtual relation that is materialized by the database system), 4) iteratively accessing (retrieving or inserting/updating) each individual tuple and advancing the database cursor, 5) committing the transaction (for insert/update) to end the access, and 6) closing the database and disconnecting from the server. Steps 3 and 4 may be repeated for each of several queries before the subsequent completion steps are initiated. For some system interfaces, connecting and opening may be a single combined operation—in this case, the specialized object subtype for this interface would have a null method for step 1, while the method for step 2 would perform the combined operation.

The relational parser object type initiates a method to open the database (step 2) when the uniform region is about to be processed. If the connection has not been made to the database server by a previous uniform region, then a method for step 1 is executed. Following issuance of the query, individual tuples are retrieved—this is actually step 4*a*, as step 4 consists of two parts. Step 4*b* iterates over each attribute field of a retrieved tuple to create another terminal data instance node for the instance tree of this uniform region. When the fields of a tuple have been processed, then step 4*a* is repeated to obtain the next tuple, until all tuples have been processed.

After all tuples for a query have been processed, or that query is otherwise exited, step 5 commits the transaction, thereby allowing the database to release access to the underlying tables that serviced this query—typically this is needed only for multi-step insert and update access but not for simple query retrieval. Step 6 to close the database is executed only when the system has determined that no further access to this database is needed, or at the end of processing the LSD and all data for it.

These generic relational database operations are further specialized for Oracle, Sybase, and Informix parsers, and for other relational systems, by specializing each of the above methods for the specific syntax and operations required by the DBMS.

Both relational and object database parser types are themselves subtypes of the 'database' object type in the system. This serves to abstract from the above methods those operations which are in common among all databases, such as generic initiation of a connection and opening the database, establishing a query or access pattern, accessing data instances, completing the access, and eventually disconnecting from the database.

For object databases, query-based access can be used to establish a focus within the OODB. Then traversal of the object instances leads to the particular data instances of interest. Each OODB system has its own query language—and some have no query language so that only navigational access is possible. In general, OODB query languages are moving toward some form of object-SQL.

The navigational access operations are specified either as a program consisting of method invocations, or preferably as a sequence of path descriptors to traverse the OODB instances. The latter can be described declaratively in terms of OODB schema edges and nodes—such as by a path expression. Some nodes along these paths are retrieved, updated, or inserted, while other nodes are intermediate points for the access.

After the query is executed and the objects have been accessed, the connection to the database may be closed when the system determines that no other access to that database will be needed or upon completion of all interactions.

Structured files, databases, and other data resources are treated uniformly—the same HLDSS specification language and LSD internal representation applies to all heterogeneous representations. The differences are dictated by the annotations.

Structured files are common as the import and export media of commercial design tools. There are two types of uniform regions for structured files: ASCII and binary regions. ASCII uniform regions include string and numeric data in 7-bit ASCII representations. A binary region consists of values which are 8-bit data (which includes control characters). Both ASCII and binary uniform regions are processed sequentially from left to right by the respective type of parser object instance.

For an ASCII region, data may be delimited (by whitespace or specified delimiters) or may consist of a specified number of characters, where this length may be determined by the value of other data which precedes the variable length string. Numeric ASCII data may be represented in standard base ten notation or, for integers, in hexadecimal or octal notation (hex begins with "0x" and octal has a leading zero). The number of elements in a sequence or repeating group of elements may be determined from the value of prior data, by encountering a different data type, or else by finding that the next data characters match a specified pattern (regular expression)—the alternative is specified by the HLDSS.

A binary region is processed by a different type of parser which recognizes 8-bit data and treats field lengths in bits rather than bytes. The length may be fixed or may be specified by prior data or terminated by data matching a given pattern (regular expression).

Another type of data resource is the World Wide Web. Each individual data source is specified by a Uniform Resource Locator (URL). A URL can be thought of as a universal file reference across the entire internet. When an annotation specifies a URL, the data resource is accessed and then the retrieved data is decomposed or parsed in the same manner as for an ASCII file. Embedded hyperlinks may also be processed by the system.

Application Programming Interfaces (APIs) consist of one or more procedures or methods that serve as the interface to a subsystem or a software package. Relational database access, discussed above, is an example of an API, though it is treated separately because of its special nature. Other API interfaces include HDF and netCDF data files, which are best accessed through the software interfaces provided for them. These API interfaces are characterized by one or more open/connect procedures, procedure invocation to specify relevant data, one or more data fetch operations (e.g., all the data at once or piece at a time), completion and closing procedures. The details of each API interface need to be implemented by program fragments, though some higher level specification is possible. The program fragments which may he needed should be relatively small and confined in scope, as they would be concerned with the local details of the API—the parsing and decomposition of the resulting data would be handled by the system based upon the HLDSS.

API interfaces may be for local (same process) interfaces or for external process interfaces via remote procedure call (RPC). The latter includes interprocess communication in the same computer as well as inter-system communications to other computers in both LAN and WAN (e.g. internet) networks. When RPC is utilized, the data arguments of the invocation as well as data returned from the call are encoded automatically by the XDR protocol into a linear stream of data for transmission over the network (e.g. via TCP/IP). Thus the arguments and returned values may be complex data structures, though some restrictions apply.

When complex structured data is returned by an API interface, the decomposition or parsing of this data structure need not be done by a specially written program, but can be uniformly processed by the system, the same as is done for other data resources. HLDSS specifications can refer to complex structured data in main memory (e.g. as returned by an RPC invocation), by specifying the appropriate annotations.

Basically, the right hand side (RHS) of an HLDSS production defines named components of the data structure referenced by the left hand side (LHS). Any of these components may involve further substructure by specifying another production with that component on the LHS. Arrays would be accessed as a sequence of elements whose length is the product of the dimensions of the whole array or of the specified array slice.

A linked list would be represented by a production with a linked list annotation. Trees would be represented by a set of productions, one for each subtree, and may be recursive, where the LHS represents a node and the RHS represents the children. For linked lists and children of a tree node, the number of components may be unspecified, in this case the "+" or "*" notation in the HLDSS for the repeating component designates one or more, and zero or more occurrences, respectively.

More general pointer-based structures would represented by an annotation on each RHS token that represents a structure that is accessed by dereferencing a pointer—this per-token 'pointer' annotation is different from the annotation at the far right side of a production which refers to the whole production.

Several user interfaces may be used. All are subordinate to and accessible from the main interface which has been nicknamed DAISy, for DAtabase Integration System This is an X windows interface and it represents the Interoperability Assistant and Toolkit. It provides a great deal of support for building and executing information bridges along with other functionality. Consequently, it is intended to be used by both the Integration Administrator as well as by general users of information bridges.

A control file approach is used to store the pertinent information needed to create and/or execute an information bridge. The control file contains information about the locations of the three specification files, the location of the information bridge, as well as pertinent information relating to data sources and data targets. An Integration Administrator can create a new control file or, in many cases, modify a similar control file on-line and save the modified file under a new name.

Two types or classes of users of the system include:

1) Integration Administrators: these are the systems specialists who understand the data requirements in detail and use the system to create information bridges. They need to have a detailed understanding of the specification language.

2) Users of the information bridges who wish to (a) transform data from one or more data sources into different representations on different systems, and/or (b) browse the combined data from possibly several sources independently of these sources and their native representation(s). These users need not have much familiarity with the system to use it effectively.

One of the capabilities available to the user is to dynamically view the progress of execution of an information bridge during the data transformation process using a monitor to show the status of each of the three separate processes:

1) Accessing the source data and building the input instance tree,

2) Applying the rule transformations,

3) Building the output instance tree and sending the transformed data to its intended destination.

These three processes are designed to execute asynchronously.

An interactive browser has been developed for viewing and traversing both the schema and the data instances arising from the heterogeneous databases and design files. Unlike the external data viewers above, with the browser of the present invention the representation of data it presents is uniform regardless of the kinds of data source(s) involved. This representation is based on logical structure diagram (LSD) formalism described earlier.

The browser provides a homogeneous presentation of both the schema and data instances from multiple heterogeneous databases and structured design files. The represents an important aspect of integration since the user need not be concerned with the differences between data models, databases, and other structured data representations. With this feature in an information bridge, the ability to graphically represent data in a uniform manner without relying on particular data models is provided.

It should be noted that such browsing may be done on either 1) schema and data prior to transformation—so as to preserve the original logic of the application; and/or 2) after such data transformations are completed—the latter thus includes the semantic integration which has been done through the transformation rules. The browsing mechanisms are the same. The ability to browse the data from either of these two viewpoints provides useful flexibility.

Figure 5:
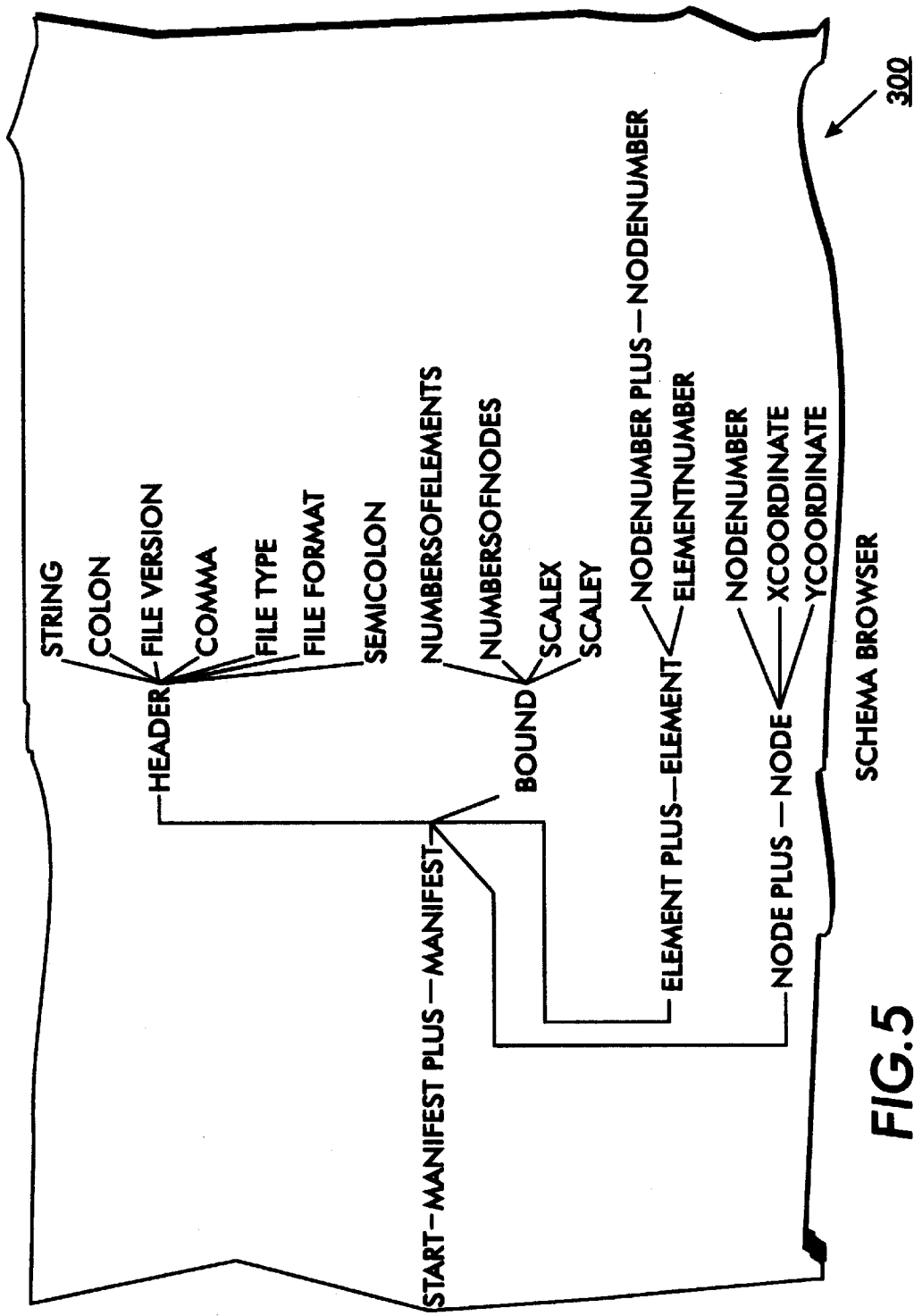
FIG. 5 shows a schema browser display.

The schema shown in FIG. 3 is displayed by browser schema 300 in FIG. 5, the browser providing both horizontal and vertical views for schema and data.

In addition to browsing the full schema and full instance trees, the user also can control how the schema and instance trees are displayed. The user may contract specific subtrees so as to focus on portions of the schema and/or data that are of interest and remain in view. Such contracted subtrees may be expanded to their full subtrees at any time during the browsing, as controlled by the user. The browser also may be switched between instance and schema displays at will.

The Browser example in FIG. 5 shows that the data values at the leaves of the schema are displayed. Data is associated only with the leaves, while the tree structure represents relationships in the source and/or target databases. Notice that only one set of related data values is shown at a time—that is, one data value for each leaf node in the LSD schema tree.

The set of menus and options include:

File Menu:
  Select a different LSD schema and data tree to browse,
  Create an additional browser window, or close a browser window.

Tree Menu: apply to both schema browsing and instance browsing
  Contract Marked Node to replace/elide the subtree under that node (nodes are marked utilizing the mouse),
  Expand Marked Node one level.
  Expand Marked Node to all levels in its subtree.
  Unmark the marked node.

Browse Menu: options to
  Switch between browsing the schema versus browsing the data instances,
  Show Next instance, Show Previous Instance
  Show First instance of a subset/subtree,
  Show Last instance of a subset/subtree,
  View Menu option to switch between vertical display (root at top and leaves at bottom) verses horizontal display (root at left and leaves at right). When browsing the data instances, the user may go to the next or previous instance relative to the current instance and a designated pivot node. The pivot serves as the point at which the notion of next and previous is applied. Thus the Next Instance operation advances to the next instance of the pivot node, and in so doing will advance each of the immediate children of that pivot node—with this effect propagating down to the leaves. Thus as the data values are moved through via user commands, some or all leaf nodes will show their data values changing.

The sequence of values for the different leaf nodes is defined as a logical 'tuple' since there is a single value in each position at any one time. That is, a tuple is defined as the sequence of data values, one per leaf node, that fall under the tree scope of a selected node, which is referred to as an 'anchor' node.

Using this notion of a logical tuple, a more compact representation of data values in tabular form, showing multiple such logical tuples at a time, is provided. To do this, the user selects a subtree of the LSD tree by selecting as an anchor node the root of this subtree. The tabular view then will display in a scrollable subwindow the sequence of tuples arising from the leaf nodes under the root of the selected subtree. There will be one tuple for each combination of leaf node data values.

Another new capability in the data-model-independent browser is the use of queries to select subsets of the overall data regardless of their source, and thereby filter out unrelated information in order to focus on selected data. From the user's perspective, performing a selective query is similar to using the tabular browsing functionality just described. In addition, the user must specify the desired qualifying condition on a leaf node to utilize this functionality.

To specify a condition, the user selects a leaf node and then selects the query parameters option from a query menu.

A dialog box then allows specification and editing of the qualifications for the node.

A structure editor for the HLDSS specification has been developed which interactively ensures that a correct specification is created. It does this by type checking each token that the user enters into the editor. It also provides the user with templates of specification constructs, and it provides feedback to the user as to the allowed components at any point in the specification.

Users interact with the HLDSS structure editor using commands and transformations. Commands include self-inserting characters, character and structure deletion, etc., and may be executed through use of the key sequences that are bound to editor commands or through the menus. A common form of transformation expands a placeholder with its own template, which is an outline of some syntactic construct containing placeholders for constituents of this expanded template.

A semantic data specification language (SEMDAL) incorporates features for management of metadata for databases, structured data, document structure, and collections of multimedia documents as well as web-based information. Metadata is descriptive information about data instances. This metadata may provide the schema structure in which the instance data is stored and/or presented. The metadata also may provide a wide variety of other information to help interpret, understand, process, and/or utilize the data instances. At times, metadata may be treated as if it were instance data, depending upon the application.

Both Standard Generalized Markup Language (SGML) and the high level data structure (HLDSS) of the present invention are subsumed by SEMDAL. SEMDAL includes frame based structures, inheritance, creation of groups of frames, etc. A subset of SEMDAL can be transformed into the HLDSS format. This enables SEMDAL to be applied to database interoperability issues for structured databases (relational, object-oriented, hierarchical, etc.) as well as for structured files.

While a subset of SEMDAL translates into the HLDSS, a somewhat different but significantly overlapping subset translates into SGML and thus offers a different surface syntax. Thus, it is the interpretation associated with the syntax that is essential. Normally, SGML is interpreted to refer to document structuring with tags (markup) and HLDSS refers to databases and structured data. However, with SEMDAL different interpretations may be associated to a SEMDAL construct to achieve either of these results. This facilitates bridging the gap between structured databases and free form text and documents.

It is important to be able to make the interpretation explicit and to be able to apply alternative interpretations within a specification language. The interpretation is defined as the operational processing which is to be applied to different constructs of the syntactic language, both in terms of the logical meaning as well as the procedures which are to be applied for a particular application. The following is an example of a Frame construct:

<!FRAME manifest :: header bound nodes numNodes;
<!ATT numNodes type=integer,
value=8 >>

Note that the ATTributes are scoped within that Frame, that attributes defined in the !ATT portion are semantic attributes, and that the names on the right side of the ": :" are structural components or structural attributes. Any representation language includes in its definition some implicit interpretations. What is important is that the set of interpretations which are being described are explicit so that different interpretations can be captured within the same language by specifying the relevant interpretations rather than needing different languages for each.

In other words, if an ATTribute is added in the above Frame with the INTERPretation that this is a 'document' then the right hand side (after ": :") will be interpreted as components of the document, consisting of a header, a bound (read as an 'abstract'), textural nodes (e.g., paragraphs), and a count of the paragraphs. When this interpretation is specified, the !Frame construct is very similar to the !Element construct of SGML.

This is one aspect of how the SEMDAL language is mapped into SGML. Also, the lexical scoping of the Frame construct is not directly paralleled by SGML. The Frame construct allows the same attribute name to be used differently in different frames due to the lexical scoping and is similar to an object definition. However, if each attribute name is used uniformly in all Frames, then the Frames of SEMDAL can be translated into the !Elements of SGML and the !ATT of SEMDAL becomes the !ATTList of SGML.

If, however, INTERPretation is specified as a 'relational database', then in the previous example Frame, manifest is a relation which has fields/attributes for header, bound, nodes and numNodes. In fact, what is referred to as the 'phyla' in the HLDSS for database interoperability is essentially what is meant here by the interpretation. This is what determines whether the HLDSS statement is to be treated as a reference to a relation, an object, or part of a parsing specification for a structured file.

Of course certain semantic ATTributes, such as type, will have meaning under just one INTERPretation or the other. Thus the INTERPretation attribute can be used by a reasoning or processing engine to determine how the other attributes and constructs of the specification should be interpreted and utilized.

The notion of interpretation enables the use of the same representation to express a matrix. This is one of the novel aspects of how interpretation is used in the SEMDAL language to unify and express seemingly diverse constructs such as structured documents, relational and object-oriented databases, and matrices.

In the following example, a 2-dimensional matrix is defined with a value that is called a WindVector. The structural components of WindVector are defined in a second Frame. "MatA" is a matrix because its INTERPretation is "matrix". This means that the right most structural component is the value at each entry of the matrix, and the other structural components are the dimensions, thus it is a 2-dimensional matrix. Hence the dimensions and value attributes could have been deduced.

| <!FRAME | MatA | :: | Lat Lon WindVector ; |
|---|---|---|---|
| <!ATT | MatA | | INTERP = matrix, |
| | | | dimensions = 2, |
| | | | value = $WindVector; |
| | (Lat I Lon) | | Units = degrees ; |
| | Time | | Units = seconds > > |
| <!FRAME | WindVector | | :: X Y Z Speed ; |
| <!ATT | (X 1 Y 1 Z) | | Units = meters; |
| | Speed | | Units = meters/second > > |

The notation "$" means that the value of WindVector rather than the string/name 'WindVector' is the value at each element of the matrix—this value consists of the 4-tuple of structural components defined in the WindVector Frame. The notation (Lat 1 Lon) allows semantic attributes which are common to multiple components or attributes to be defined concisely in a single expression; similarly for the Units of (X 1 Y 1 Z). Of course, this example is not the only way of representing the direction and speed of a wind vector.

Though it is not necessary in this case, the two frames above could be grouped together by a grouping clause with documentation such as:

```
<!GROUP  WindMatrixA
    <!ATT   WindMatrixA   Members = (MatA, WindVector)
            WindMatrixA   Documentation = "documentation string">>
```

In view of the above, matrices can be represented in a relational database by a relation defined for each matrix and having an attribute/field for each of the N dimensions, and another attribute for the value—or several attributes if the value has substructure. Then each tuple would contain the N coordinates followed by the value at that coordinate. This could be space efficient for sparse matrices.

N-ary relationships are also achieved as another interpretation of a Frame. Note that the !ATTribute specifications within a Frame define only ternary relationships between the component, the attribute name and the value for that attribute. For example in <!ATT Time Units=seconds>the component is Time, the attribute is Units, and the value is seconds.

An interpretation of a Frame as a 'relation' provides the left hand component (before the ": :") as the name of the relation and the right hand components as the components that participate in the relation. Normally a single construct in other specification languages could not represent both the substructure of a document and an n-ary relationship with the same kind of specification statement, but here this is accomplished easily through the novel use of an INTERPretation.

Thus, an n-ary relation may be defined by a Frame as in the following example:

```
<!FRAME  Supplies   ::  Supplier PartNo ShopLocation Cost ;
    <!ATT   Supplies        INTERP = relation;
            Cost            Currency IN (US-dollars 1 Canadian-
                              dollars),
                            type=integer > >
```

The semantic attribute INTERPretation as a 'relation' means that this Frame represents the Supplies relationship between Supplier, PartNo, ShopLocation and Cost. The Semantic attributes also indicate that Cost is given as whole dollars (integer) in either US currency or Canadian currency. In the !ATT clause either "=" is used to set a default value or an "IN" comparator to constrain the value to an enumerated set of possible values or a range. An attribute also can be defined without specifying its default value. Other comparators would be expressed as constraints. If it is desired to specify a constraint by "IN" as well as to set a default value, two expressions would be used, for example:

<!ATTCost Currency IN (US-dollars 1 Canadian-dollars), Currency=US-dollars>

Note that the above INTERPretation as a 'relation' is not the same as a relational database, since here it has not been committed how this 4-ary Supplies relation is to be materialized and stored. This relationship could be, if one wanted, represented by Horn logic clauses in a prolog system.

Logical variables for both values as well as for names in SEMDAL are now introduced and it is shown how constraints can be expressed in terms of these variables. Variables can be denoted as ?XX where the"?" indicates that XX is the name of a variable, and XX may be any alphanumeric string where the leftmost position is alphabetic and capital letters and lower case letters are treated as different. The variable may stand for either a value or a name of any term in SEMDAL, that is, the variable may stand for the name of a Frame, the name of a structural component (on the right side of the ":: "), the name of a semantic attribute or a semantic (sub)attribute of an attribute (a slot), etc.

The meaning of the variable is designated by setting it equal to the components involved. Use of the wildcard "*" can refer to multiple components, which may be further restricted if desired by a predicate that the variable also must satisfy. Thus valid expressions for defining variable include:

1. Supplies.Cost.value=?Cv, which is equivalent to Supplies.Cost=?Cv.
2. Supplies.Cost.Currency=?CR
3. Supplies.Cost.type=?Ty
4. Supplies.Cost.*=?Cattr
5. Supplies. {*}=?Aset
6. Supplies.*Components=?Scomp The first expression above defines the variable ?Cv to be the value of the Cost component in the Supplies frame, while the second and third expression define the logical variable ?CR and ?Ty to be the values of the semantic attributes Currency and type respectively. The fourth expression defines the variable ?Cattr to be one of the attribute names in the set of attributes of Cost, while the fifth expression defines the variable ?Aset to be the set of attribute and component names of Supplies—the curly braces { } indicate that the set of attributes rather than one attribute is intended.

The last expression defines ?Scomp to be one of the immediate structural components of Supplies, that is one of the components defined on the right side of the ": :" name Supplier PartNo., ShopLocation, and Cost. Note that the reserved expression *Components refers to any one of the structural components of a frame, whereas the "*" in "FrameName.*" refers to any of the attributes of the frame, be they structural or semantic attributes. The notation {*Component} would refer to the set of structural components. Similarly *Semantic refers to any one semantic attribute and {*Semantic} refers to the set of semantic attributes. More generally, predicates in the form of additional constraints can be used to limit the set of possible values for a variable.

Constraints are a very important part of metadata for the following reasons:

1. Constraints express logical consistency among different schematic constructs and definitions when they are interrelated in the real world.
2. Constraints provide an important means of expressing semantics involving multiple objects.
3. Constrains express the requirements for data consistency within complex databases and between different sites that contain interrelated data values.
4. Constraints can express conditions and predicates which may signal important events.
5. Constraints are used to make the active metadata repository respond to changes and events and to initiate actions dynamically.
6. Constraints go beyond the trigger mechanisms that have been and are being introduced into commercial database systems.

All constraints and expressions involving variables and/or involving operators other than "=" and "IN" by separate <!Constraints . . .> statements, each of which is referred to as a constraint set. This will lead to a 'constraint-rule' package that will be developed.

The !Constraints set can be lexically within a Frame, or can be in a !Group clause, or can stand alone outside of a Frame—the latter is appropriate when constraints interrelate components of two or more frames. The Constraints set is named and may contain multiple constraints separated by ";" and ended by the closing ">".

The six expressions listed above which define logical variables can be seen as constraints, since the variables are constrained relative to values and/or names of components and attributes. Since some variables may refer to names and other variables may refer to values, one can have expression such as <!Constraints Cst1 ?Cattr.value=?CV> which defines a constraint set name Cst1 and means that the variable ?Cv can stand for (be bound to) any of the values of those attributes whose name can occur for the variable ?Cattr. This constraint involves two variables. Other constraints may further limit the actual choice.

More generally, constraints do not need to involve variables. For example, the following constraint statement:

<!Constraints Cst2 Supplies.Cost< Supplies.CeilingPrice Supplier.KindOf=SmallBusiness> constrains the Cost of a supply item to be less than or equal to the CeilingPrice of that supply item, and it constrains the kind of Supplier to be a small business.

The dotted expressions, such as Supplies.Cost, are path expressions, and the value of the component on the right-most side of that path is the value which is being constrained. A suffix of ".value" could be added to the right side of each path for the same effect.

The way variables may be defined for constraints may also be generalized. While the six constraint expressions above defined each variable in terms of its allowed set of values, another form of constraint makes the value set implicit in terms of how the variable can be bound. thus a constraint such as:

<!Constraints Cst3 Supplies.?X.value=?Y> binds variable ?X to any component or attribute of Supplies which has a value, and it binds ?Y to the value of that component.

The translation of SEMDAL to a logic language such as KIF (Knowledge Interchange Format) has yet to be developed for reasoning and consistency analysis of a set of semantic constraints. The notion of constraint packages with enforcement actions to maintain data consistency among distributed heterogeneous databases also needs to be further developed.

One of the significant advances made by the present invention is the seamless ability to store diverse forms of metadata in a single repository utilizing a single logical and physical storage scheme. The differences between metadata representations as currently used are accounted for via the operational interpretation of the uniformly stored information. Furthermore, alternative syntactic realizations of this metadata are provided so as to continue to support those applications which expect different syntax for different uses.

The logical design level of the metadata repository allows for multiple implementations and is convenient in different storage architectures. The physical storage of one implementation is relation-based in order to be accessible with the Java Database Connectivity (JDBC) standard for the Java interfaces to relational databases. Note that the choice of repository implementation is independent from the data models being described.

The metadata repository of the present invention encompasses both structure and semantics, and it does so in a way that can accommodate separately developed and different metadata within a primary framework.

The main structural representation focuses on hierarchical tree-structures as the dominant structuring mechanism. It also accommodates full directed graph structures through cross-referencing among nodes in the spanning tree of the graph.

The semantic representation consists of three levels:

Semantic Frames, attributes, and subattributes or slots,

Reference to agreed upon semantic features and values to take advantage of existing terminology and ontologies, and Use of logic-based and rule-based expression of semantics to supplement agreed upon declarative semantics with areas where standards are not yet evident, and to provide executable definition of such semantics.

At the structural level, the primary characteristics of SGML (Standard Generalized Markup Language), HTML (Hypertext Markup Language), and the new evolving XML (Extensible Markup Language) have been subsumed, as well as the heterogeneous database structures—including relational and object-oriented models, and to provide extensibility to address multimedia data.

Although the existing representations for structured documents, databases, and semantic knowledge representation are rather different on the surface, unification at the logical level has been achieved. The common framework, then, admits alternative syntactic presentations—the need for which has heretofore accounted for the superficially large differences between different specification languages.

Furthermore, this syntactic diversity has been capitalized on to admit yet other alternative syntactic expressions for both output as well as input, thereby enabling the development of specialized mini-languages for particular applications while retaining a common underlying semantics and uniform internal representation. Such syntactic diversity has been accommodated by providing for an input parser and an output formatter to realize each such specialized mini-language. Both the parser and formatter communicate with the common logical representation.

It is tempting to refer to this logical representation as the 'internal' representation, but in fact this single logical representation could have its physical storage implementation in a relational database, or an object-database, or in a hierarchical or network database architecture just as easily. A relational storage implementation has been chosen because of its accessibility through the increasingly popular JDBC application programming interface.

The metadata representation of the present invention shall be referred to as the Semantic Metadata Description Language, or SEMDAL and is also referred to as MDS (MetaData Specification) for short. It is a frame-based representation where a MetaFrame contains potentially multiple attribute value specifications. Each attribute may have subattributes, and these too may have subattributes if needed. This creates a potentially hierarchical array of descriptors. A simple example of such descriptors are 'units' and 'precision' information for length, weight, or other measures.

The potential hierarchy of semantic descriptors, and the actual substructure of the stored data are distinguished as described by the MetaFrame's metadata. Such data substructure is explicit as in SGML, and is denoted by a 'Substructure' attribute (similar to SGML's '!Element'), or by using a syntactic shorthand similar to BNF (Backus-Naur Form) grammar specifications.

The shorthand: Aggregate :: component1, component2, . . . , stands for: Aggregate.substructure=component1, component2, . . . .1 The right hand side admits alternation ("|" representing "or") between subsequences of terms. In this case, the right side must consist only of one level of alternation of subsequences, and thus parenthesization is not used.

Suffixes "?" for zero or one, "*" for zero or more, and "+" for one or more are utilized. This is very similar to SGML's !Element construct when used to define non-terminals. For some component or aggregate A, the semantic attribute A.tagged="start end" or "start" is used to represent SGML's tag minimization scheme of "—" for start and end tags being required, "-O" for start tag required but end tag optional. The default tagging is neither start nor end tag is required—it is thus necessary that the target syntax be parsable unambiguously for it to be acceptable.

For tree structured (and of course flat) data, this grammar-like representation for substructure is quite appropriate. For full graph-structured data, such as may occur in object-models and in the network data model, a node may have multiple predecessors—that is, a node may participate in multiple aggregations or collections. If a copy of the node is not sufficient because the shared aspect must be captured, a cross-reference of the form #node is used to create the multiple references to the common node—this is analogous to the use of #tag references in HTML. So for example, if both B and D are to represent the same identical structure, to write:

A:: B C D(=#B)
  where "#B" represents the identity of "B". An equivalent form of expressing this is:
  D.substructure.!ID=B.substructure.!ID,
    where "! ID" is the system's identifier for the substructure. Simply to initialize some component E to be a copy of B's substructure, could be written as:
    E.substructure=COPY [B.substructure],
      where COPY is a structure copy operation on the value of B.substructure.

Thus for graph-structured data, the spanning tree could be created, and then cross-references to correctly represent the shared nature of multiple references to a node could be done.

The underlying logical model for the metadata repository thus is a hierarchical structural model that can represent the spanning tree over a graph or directed graph structure. The logical model for semantic attributes provides a hierarchy of subordinate descriptors—this semantic hierarchy is separate from the structural hierarchy. Each semantic descriptor can be represented as a whole, with operations to retrieve the associated value, the parent descriptor which is refined by this subattribute, and the set of subattributes of the current descriptor.

This features of the logical model can be represented and stored in an object-database or a nested-relational database (there are few nested relational databases). It can be conveniently represented in a traditional relational database through the use of keys which reference the subordinate hierarchical levels. Similarly, the structural hierarchy is reflected by tuples in a different relation, with similar ability to find the parent aggregate and/or the component children of a non-terminal node. Thus each level of the semantic hierarchy and the structural hierarchy are represented by tuples in relational tables, and references to subordinate (or parent) levels is effected through the relational join operation.

The basic group is a Metaframe, which is named. The MetaFrame is started with "<MetaFrame", every completed line ends with semi-colon ";" except that this is optional for the last line. The MetaFrame is closed with "/>" or, optionally with "/MetaFrame>.

MetaFrames are not syntactically nested. A MetaFrame contains semantic attributes and sub-attributes (slots) which may be nested arbitrarily deep. A MetaFrame also contains structural components which may themselves be aggregates of other components.

Thus to describe a Clock-Schema MetaFrame, would be written:

```
<MetaFrame Clock-Schema ;
    Clock           ::Face Hands ;
    Hands           ::HourHand MinuteHand SecondHand ;
    /MetaFrame>
```

The representation for an analog watch then can refer to Clock-Schema.SecondHand.Length.Units to define the units in which the length of the second hand will be expressed. Then a simple number in the actual data representation will have meaning that is explicit. Such units is semantic information and is part of the metadata that is managed, and it is necessary information in order to properly utilize the actual length data values—which may be stored in a separate database of instance data.

Note that the abbreviation used above "::" represents the 'Substructure' attribute, and this is a syntactically convenient way to express:

Clock. Substructure=Face Hands

Note also, that multiple values for an attribute are allowed, where ordering is important.

Uniformity of representation in SEMDAL is achieved by recognizing that seemingly different data models and representation formalisms differ mostly in terms of how they represent information, and, in fact, there is much overlap between data models. The superficial differences often involve implicit assumptions in a data model, such as the implications of syntax. These assumptions are made explicit in the SEMDAL model.

For example, the following is written:
S1 [A B C D]
it could be defining:
1) a relational table called S1, or
2) a sequence of A . . . D, and naming that sequence S1, or
3) a set S1 of elements A . . . D where order does not matter, or
4) an object class S1 with data members A . . . D, or
5) a four dimensional array called S1.

Each of these are referred to as different interpretations of the same syntactic representation. SEMDAL provides a system level attribute 'INTERP' to capture this INTERPretation, indicating, for example, whether the data is from a relational database table or from the data members of an object.

Note that hierarchical structure of the data is defined using "Substructure" attributes or its abbreviation as"::". In contrast, subattributes, such as "units", do not define substructure of the data—rather these subattributes provide additional metadata to help interpret the data which is presented.

In the semantic attribute specification above for units, the expression "Clock-Schema.SecondHand.Length.Units" is an attribute path expression and the 'dot' separates each 'attribute term' of the path expression. Thus "Clock-Schema", "Second-Hand", "Length", and "Units" are each attribute terms. Such a term can be the MetaFrame name (leftmost term if present), a structural component, or semantic attribute or subattribute (slot) to any depth.

To indicate that all "Units" are in "cm" centimeters, a pattern-based attribute expression may be used to indicate this as:

*.Units="cm"

The "*" here refers to an arbitrary number of higher level terms in the path expression, and says that for any components or attributes where Units is appropriate, the Units to be used are centimeters. Other path expression patterns include:

Foo.Bar.*.Units—to indicate only Units of attributes any depth under Foo.Bar

Foo.?.Units—to indicate only Units one level under Foo.

If an attribute or component is to have several attributes specified, say Length and Width, may be abbreviated as follows, where the alternatives are enclosed in parentheses and are separated by "|" the alternation symbol:

HourHand.(Length | Width).Units="cm" which means

HourHand.Length.Units="cm"

HourHand.Width.Units="mm"

Beginning a line with a dot is a form of elision, which refers to and includes the parent attribute path that appeared on the previous line—that is, all attribute terms except the rightmost term. As an example, this defines values for Length and Width using "." ellipses:

| HourHand. | Length | = 3.5 |
|---|---|---|
| . Width | = 8 | |

In general, when multiple attributes refer to the same prefix of an attribute path expression, may be written:

Name.(Type="string", length=40, default="Omega");

Note that for rightmost terms in an attribute path, a comma separates each attribute-value pair.

Similarly, if the same attributes apply to multiple components, may be abbreviated as:

(HourHand | MinuteHand). (Length.Units="inch", Width.Units="mm").

Here both the HourHand and the MinuteHand are being assigned semantic attributes as to the units for Length and Width. Note that only one alternation set (separator "|") may appear in an attribute path expression, and only one attribute value list (comma separator ",") can occur in a path—both can occur in the same path.

Data typing is indicated by A.type attribute, for some attribute path A. Also, A.default specifies a default value, and "A.value=or just "A=" indicates an (initial) value. A list of tokens may be given for a semantic attribute, thereby creating an ordered multi-valued result. Each value token also may be treated as a semantic attribute which can have further attributes. So for example below, "Methods" has a pair of method names as its value, and here one of these values, "Rotate", itself has the semantic attribute of "Args":

Object.Methods=Rotate Zoom;

Object.Rotate.Args=HAngle VAngle;

indicates that Rotate and Zoom are Methods of Object, and that the Arguments of Rotate are HAngle and VAngle. One could instead have written "Object.Methods.Rotate.Args= HAngle VAngle" to make "Methods" explicit, but only one alternative (i.e., with or without "Methods") can be used within a given specification in order to provide consistency. One may then refer to "Object.Rotate.VAngle", etc. Note that the system attribute ! Multiplicity automatically will be given the appropriate value (see page 10), so Object.Rotate-.Args.!Multiplicity will yield the value 2.

In the following example, both an object database (ODB) and a relational database (RDB) as well as a photo are represented. The name of the MetaFrame is MDS1—often the name of the frame may be given to be the same as the first leftmost component (here 'Manifest'). Note that "::" is an abbreviation for substructure.

```
<MetaFrame MDS1 ;
    Manifest        ::   header+ bound+ Photo ;
    header          ::   Name Version Type Fmt ;
    bound           ::   numElements numNodes scaleX scaleY ;
    bound.INTERP             = "ODB" ;
    bound.System             = "Ontos" ;
    bound.OSQL               = "Select Mesh.bound ..." ;
    header . INTERP          = "RDB" ;
              .System  = "Sybase" ;
              .Site    = "@db.foo.com:42" ;
              .Access  = "Fred" ;
    (Name|Version).(Type="string", Length=40) ;
    Version.Default          ="1.0" ;
Photo.(Type="Image", Encode="JPEG", Size=480, Location="NYC",
    Title="Metadata Architecture...", Date="6/5/97", SequenceNo=34,
    Size.Units      ="kB") ;
/MetaFrame>
```

The ODB above has substructure consisting of a set of header information—the "+" indicates one or more occurrences of this information, similarly for bound. Thus the object database contains a set of bound information, while the relational database contains a table with all the header information.

In the list of semantic attributes, the dot before System, Site, and Access indicates that "header" prefixes each of these, since header is the leftmost component on the previous line. Both the Type and Length information are the same for Name and Version. Note that the alternation symbol "|" is used between attribute names that constitute different attribute path expressions—in the same spirit as in SGML. When multiple attribute values are assigned, as for Type and Length, a comma is used as the separator to denote a list of attribute-value pairs, as for the multiple attribute values for Photo.

Note that the Size attribute for Photo has a semantic subattribute indicating that the size is in kilobtyes. In general, any attribute may have subattributes, and these in turn may also have subattributes—providing considerable extensibility as more of the implied knowledge of an application is made explicit.

Attributes such as INTERPretation are system defined attributes. In order to avoid name conflicts as the application designer creates attribute names, system attributes may be prefixed with the "!" exclamation mark, as "! INTERP".

The logical structure described for the Metadata repository is hierarchical, which could be naturally implemented in a 'nested relational' database or an object database, as well as in other databases. Due to the increasing value of the JDBC connectivity between Java programs and relational databases, a relational implementation has been chosen. Thus the Metadata Repository will be accessible via the JDBC standard API. The metadata which are stored describe related instance data—which usually is stored separately in one or more repositories, such as in a relational or object database, document repository, or multimedia digital library.

Each line of the MetaFrame needs to be represented, and nested suhattributes as well as explicit substructure need to be provided for. A relational table MetaFrameAttributes is defined to represent the primary semantic information from each attribute line of the MetaFrame. The columns of MetaFrameAttributes are:

MetaFrameAttributes

[FrameName AttributePath' Value ParentAttributePath LocalAttribute DataType Multiplicity]

The full attribute path includes the Frame name—if the Frame is unnamed it is given a default name of "!Unnamed". For the purpose of storage, the FrameName is listed in a separate column for indexing, thus the AttributePath' in the MetaFrameAttributes relation does not include the FrameName.

Each of the attribute components which are bounded by a dot' delimiter on one or both sides is referred to as an 'attribute term'. Thus the attribute terms in "Auto . Engine . NumCylinders" are "Auto", "Engine", and "NumCylinders". The AttributePath includes the attribute terms from left to right as a single string, including the 'dot' delimiters.

The 'Local Attribute' is this rightmost attribute term in an attribute path. The 'Parent AttributePath' is formed by removing the LocalAttribute from the AttributePath'. For top level elements, the Parent is shown as null, which means that the Frame is the parent. Several of the entries have been expressed separately for indexing purposes—so that one can easily find all components of a Frame, all children of an attribute path, the parent of a path, and all local attribute names.

The DataType is the data type for the value of this semantic attribute. The DataType may be specified in the MetaFrame explicitly as in <attribute-path>.Type or it will be deduced (guessed) by the data entry subsystem—when it is explicit, there will be MetaFrameAttributes tuple for the .Type. The value is stored as a string, and the DataType information is used to coerce this string value to the appropriate language type as needed.

Multiplicity is set to 'one' if the value consists of a single token or if double quote marks are around the whole value, thereby making it a single string. Otherwise, if a subattribute "ValueSeparator" exits, it is used to parse what is given for the value into the actual multiple values. Else whitespace is used as the separator to parse the value and determine the Multiplicity. Upon retrieval of this information, the subattribute ! Multiplicity (where "!" is required) is materialized from this Multiplicity field, rather than being stored and retrieved as a separate attribute path tuple. System attributes of the form "! 1" and "!<integer>" are also provided, where the "!" is required, to reference the first through nth value in a multi-valued result—giving n>!Multiplicity is an error.

If elision were used in the initial representation, the elision is expanded initially and the full attribute path expressions are utilized for entry into this relation. The entries in all Frames without names are treated as if they were in a single unnamed Frame. Attribute paths for other named Frames may be specified in an unnamed Frame. Order of entries is not important within a Frame, though by convention all substructure information precedes semantic attribute information.

Wildcard expressions in an attribute path include special symbols such as "* " for zero or more attribute terms, or "?" for one attribute term. These wildcard attribute path expressions are entered directly in the table as is, and also are expanded for all existing attribute paths, with each expansion entered separately as well. When new attribute paths are entered, they will be checked relative to the existing wildcard expressions. When new wildcard expressions are entered, they will be checked relative to all existing attribute paths. Wildcard expressions involving "*" may be qualified, by naming the "*" as in "*x", and including a qualifying expression, as in Car.*x (|x |<3, x 1="Level?") .NumCylinders. The qualifying expression, within the "( )", says that up to 3 attribute terms may occur, and that the first/leftmost must match the given string pattern, i.e., must begin with "Level" followed by one more character.2

The substructure portion of a MetaFrame consists of those lines, typically placed first in the MetaFrame, which have "::" following a token—or an attribute path ending in substructure—these are often referred to as structure productions. To represent this information in a relational database, to create a relational table MetaFrameStructure:

MetaFrameStructure [FrameName LHS RHS Occurrence Order Alternative]

where LHS is the left hand side of the "::" or the parent attribute path of substructure, and RHS is one of the right hand side components. There is one such tuple for each right hand side component. Order is the ordinal position, starting at one, and taken from left to right, of this RHS component. Occurrence is the occurrence flag for that RHS: either "?", "*", "+", or blank—representing respectively one, zero or more, one or more, or single occurrence. The first three columns of the MetaFrameStructure table are separately indexed.

The Alternative field defaults to "1" unless this structure production contains two or more alternatives, indicated by "|" to separate each alternative. In this case, the production must consist only of alternatives at a single level, and thus with no parentheses. All terms within the first alternative would have "1" in this Alternative field, with the Order starting from one for the leftmost term; the second alternative would have "2" in this Alternative field, with the Order again starting from one for the leftmost term in this alternative. If there are multiple productions with the same left hand side, they are stored the same way as in the "|" case, with the Alternative number determined by the order of presentation.

Note that all RHS's which do not appear as a LHS are 'terminals' in the sense of the substructure 'grammar'. All RHS's which do appear as a LHS are 'non-terminals' and do not generally correspond to individual data values in the database being described, but rather are placeholders for the substructure.

A structure path expression may begin with a FrameName and consists of dot-separated terms, each term being a LHS or RHS, such that the RHS must correspond to that LHS. If this LHS also appears as a RHS, the structure path may continue with a corresponding LHS. Thus in the MDS1 example on page 8, the structure path "Manifest.bound-.scaleX" could be used to refer to this structure, the associated value, as well as any other semantic attributes of scaleX. Also, a structure path expression ending in a non-terminal can be used to refer to the data structure instance(s) corresponding to this non-terminal—each instance itself being a data structure consisting of the multiple data values and their associated structure, as described by the MetaFrame productions. Structure path expressions can be used in a generic uniform query language to refer to data in any form of structure or database, based upon the metadata in the repository.

In some systems, such as relational databases, the basic table definitions and some related information are stored in 'system catalogs' which themselves are relational tables which may be accessed by the user in read-only mode. All such data may be accommodated in the structure as shown so far. An example of this kind of catalog information, taken from Informix, is:

SYSTables [tabid, tabname owner rowsize ncols nindexes . . . ]
SYSColumns [tabid colno colname coltype collength . . . ]
These are represented as the following MetaFrames:
<MetaFrame SYSCatalogs;
   SYSTables :: tabid tabname owner rowsize nindexes . . . ;

```
SYSColumns :: tabid colno colname coltype
    collength . . . ;
(tabid | tabname | owner).type="string";
(rowsize | nindexes).type="integer";
(colname | coltype).type="string";
(colno | collength).type="integer";
/>
```

Sometimes the descriptive metadata is of the same nature for each entry. For example, the metadata for a relational database usually will consist of the same kinds of descriptive attributes for each relational table and for each column, just with different values. In these cases a more compact representation as a table of Metadata values is possible—though doing imparts no additional information. That is, if the kinds of semantic attributes are the same for each, the same attribute subpath does not need to be repeated for each different table and value. Rather, each attribute subpath could be taken as a column name in a meta-table to provide greater conciseness.

It should be noted that the metadata framework can be used to describe the structure and semantics of the MetaFrame representation as well as the metadata implementation vehicles of MetaFrameAttributes and MetaFrameStructure tables. Thus the metadata repository is self-describing. This observation helps to address notions of "meta-meta-data". Specifically, since the metadata framework developed is self-describing, there is no need for further levels of "meta-meta" representation formalisms.

XML is an emerging language called the Extensible Markup Language. It is intended to extend and eventually supersede HTML (Hypertext Markup Language), and to be in the spirit of SGML (Standard Generalized Markup Language) but to be substantially simpler than SGML.

When the SEMDAL language is compared with XML it can be shown that: 1) XML capabilities are subsumed, 2) SEMDAL is much more concise, and 3) semantic representational capabilities are provided that go beyond the natural abilities of XML.

First the SEMIDAL representation is presented, followed by the XML representation given by XML advocates. The example is that of a bookstore order system, which sells books, records, and coffee. The example comes from XML literature. The example is reexpressed in the structure SEMDAL and meaningful semantic attribute information has been added—these semantics are not present in the XML version given in earlier even though that specification is much more verbose. The SEMDAL representation is:

```
<MetaFrame BookOrderSchema
    ORDER    :: ID SOLD-TO SOLD-ON ITEM+ ;
    SOLD-TO              :: PERSON ;
    PERSON               ::LASTNAME FIRSTNAME ;
      ITEM :: PRICE ENTRY
      ENTRY       ::BOOK | RECORD | COFFEE ;
    BOOK     :: TITLE AUTHOR ;
    RECORD       :: RTITLE ARTIST ;
    RTITLE   :: TITLE COMPOSER? ;
    COFFEE   :: SIZE STYLE ;
        *.Format   ="Delimited Tagged Named Start End" ;
        *.Required ="Yes" ;
        *.Type     ="pcdata" ;
        ORDER.ID.Format = "Attribute WithinTag" ;
        SOLD-ON.Range.lextype = "Date.ISO8061" ;
        SOLD-ON.Range.presence = "fixed" ;
        ITEM.Occurs = "multiple" ;
        COMPOSER.Format.Inherits = "*.Format" ;
        COMPOSER.Format = "Embedded" ;
        COMPOSER.Required = "No" ;
    /MetaFrame>
```

This MetaFrame indicates that an ORDER consists of an ID, the last and first names of the Person to whom the order is sold, the Date sold, and a list of multiple ITEMS—each of which has a PRICE and is either a Book, a Record, or Coffee—alternation "|" on the right hand side of a substructure expression means exclusive "OR". The ID is a named attribute inside a XML tag.

Note that the "*. Format" declaration uses a 'wildcard' to define all Formats as "Delimited Tagged Named Start End". The semantic attribute declaration "COMPOSER.Format= Embedded" would override that wildcard Format. To include Format declarations, declare 'COMPOSER.Format.Inherits="*.Format" ' also needs to be declared, which means that the Format for COMPOSER is to inherit the Format defined by the wildcard expression. The approach to inheritance is the make it explicit and to allow it to be selective, rather than inheritance being forced, all or nothing, by standard subclassing mechanisms.

All other structural information is via explicit tags, which name the entry and delimit both the Start and End of the entry. Note that "pcdata" just means ASCII data, similar to "pcdata" in SGML declarations. The Composer information is optional, and occurs as an embedded (inline) tag within the Record Title.

The DAtabase Integration System DAISy) of the present invention has been described in detail and how it provides interoperability across heterogeneous resources, including databases and other forms of structured data. In this system, the major differences between diverse data representations are accommodated by high level LSD (Logical Structure Diagram) specification language, and by use of annotations to factor out of this declarative language the heterogeneity among different databases and data structure representations.

When coupled with the emphasis on program generation, these annotations enable generation of substantially different code for different systems of representation. The data transformations are expressed via a set of localized coordination rules which interrelate components from the source specification with components of the target. This approach allows the rules to be more declarative in nature, and also supports asynchronous processing of the transformations, thereby being amenable to parallelization.

It is, therefore, apparent that there has been provided in accordance with the present invention, a method for processing heterogeneous data that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. A method for integrating heterogeneous data embodied in computer readable media having source data and target data comprising:

providing an interoperability assistant module with specifications for transforming the source data;

transforming the source data into a common intermediate representation of the data using the specifications;

transforming the intermediate representation of the data into a specialized target representation using the specifications;

creating an information bridge with the interoperability assistant module through a process of program generation;

processing the source data through the information bridge; outputting the target data, wherein the target data is in a non-relational form with respect to the source data; and outputting the target data, wherein the target data is in a non-relational form with respect to the source data, wherein providing the interoperability assistant with specifications comprises:

inputting a first high level data structure specification which describes the source data representation;

inputting a second high level data structure specification which describes the target data;

inputting a high level transformation rule specification;

processing the first high level data structure with a first schema analyzer and a recognizer generator to generate a source recoanizer module;

processing the second high level data structure with a second schema analyzer and a view generator to generate a target builder module;

processing the high level transformation rule specification with a transformer generator to generate a transformer module;

parsing the first high level data structure specification with the first schema analyzer to create an annotated logical structure diagram, the logical structure diagram serving as a schematic structure graph that represents the logical relationships of the source data in a context-independent uniform manner; and parsing the second high level data structure specification with the second schema analyzer to create an annotated logical structure diagram, the first logical structure diagram serving as a schematic structure graph that represents the logical relationships of the source data in a context-independent uniform manner.

2. The method as claimed in claim 1, wherein the first high level data structure specification and second high level data structure specification comprise:

diverse metatadata, including semantic metadata.

3. The method as claimed in claim 1, wherein inputting the first and second high level data structure specifications comprises:

programming grammar productions;

programming type descriptions; and programming annotation specifications.

4. The process as claimed in claim 3, wherein programming grammar productions comprises:

specifying the logical structure of the heterogeneous data using grammar rules to form a uniform representation of the data, wherein a right hand side and a left hand side of each data statement of the heterogeneous data is produced.

5. The process as claimed in claim 1, wherein parsing further comprises:

forming nodes and edges of the first logical structure diagram, each node and edge being logicially associated with a label and an interpretation, the label of a specific logical structure diagram component corresponding to a particular application schema component and the interpretation of the logical structure diagram impacting the meaning of the nodes and edges of the logical structure diagram and being derived from the annotations in the high level data structure specification to enable using the same high level data structure specification syntax and the same logical structure diagram contsructs to represent diverse data models and application schema.

6. The process of claim 1, wherein inputting the high level transformation rule specification comprises:

applying transformations to subtrees of the logical structure diagram schema tree for the source, each transformation rule coordinating some input or intermediate data objects to other intermediate objects or output objects, the collection of the rules forming a data flow network which maps the input structure or schema to output structure/schema, asynchronous execution of the rules in the information bridge carrying out the actual data transformations.

7. The method of claim 1, further comprising:

providing a first user interface for a first user which interacts with the combined uniform schema and data obtained from multiple data sources.

8. The method of claim 7, further comprising:

providing a second user interface for a second user which interacts with existing tools and various data representations.

9. A method for integrating heterogeneous data embodied in computer readable media having source data and target data comprising:

providing an interoperability assistant module with specifications for transforming the source data;

transforming the source data into a common intermediate representation of the data using the specifications;

transforming the intermediate representation of the data into a specialized target representation using the specifications;

creating an information bridge with the interoperability assistant module through a process of program generation;

processing the source data through the information bridge; outputting the target data, wherein the target data is in a non-relational form with respect to the source data; and outputting the target data, wherein the target data is in a non-relational form with respect to the source data, wherein providing the interoperability assistant with specifications comprises:

inputting a first high level data structure specification which describes the source data representation;

inputting a second high level data structure specification which describes the target data;

inputting a high level transformation rule specification;

processing the first high level data structure with a first schema analyzer and a recognizer generator to generate a source recognizer module;

processing the second high level data structure with a second schema analyzer and a view generator to generate a target builder module;

processing the high level transformation rule specification with a transformer generator to generate a transformer module;

parsing the first high level data structure specification with the first schema analyzer to create an annotated logical structure diagram, the logical structure diagram serving as a schematic structure graph that represents the logical relationships of the source data in a context-independent uniform manner; and parsing the second high level data structure specification with the second schema analyzer to create an annotated logical structure diagram, the first logical structure diagram serving as a schematic structure graph that represents the logical relationships of the source data in a context-independent uniform manner, wherein parsing the first and second high level data structure specifications includes forming nodes and edges of the first logical structure diagram, each node and edge being logically associated with a label and an interpretation, the label of a specific logical structure diagram component corresponding to a particular application schema component and the interpretation of the logical structure diagram impacting the meaning of the nodes and edges of the logical structure diagram and being derived from the annotations in the high level data structure specification to enable using the same high level data structure specification syntax and the same logical structure diagram constructs to represent diverse data models and application schema.

10. The method as claimed in claim 9, wherein the first high level data structure specification and second high level data structure specification comprise: diverse metadata, including semantic metadata.

11. The method as claimed in claim 9, wherein inputting the first and second high level data structure specifications comprises:
   programming grammar productions;
   programming type descriptions; and
   programming annotation specifications.

12. The process as claimed in claim 11, wherein programming grammar productions comprises:
   specifying the logical structure of the heterogeneous data using grammar rules to form a uniform representation of the data, wherein a right hand side and a left hand side of each data statement of the heterogeneous data is produced.

13. The method of claim 9, further comprising:
   providing a first user interface for a first user which interacts with the combined uniform schema and data obtained from multiple data sources; and
   providing a second user interface for a second user which interacts with existing tools and various data representations.

14. A method for integrating heterogeneous data embodied in computer readable media having source data and target data comprising:
   providing an interoperability assistant module with specifications for transforming the source data;
   transforming the source data into a common intermediate representation of the data using the specifications;
   transforming the intermediate representation of the data into a specialized target representation using the specifications;
   creating an information bridge with the interoperability assistant module through a process of program generation;
   processing the source data through the information bridge; outputting the target data, wherein the target data is in a non-relational form with respect to the source data; and
   outputting the target data, wherein the target data is in a non-relational form with respect to the source data,
   wherein providing the interoperability assistant with specifications comprises:
      inputting a first high level data structure specification which describes the source data representation;
      inputting a second high level data structure specification which describes the target data;
      inputting a high level transformation rule specification which includes applying transformations to subtrees of the logical structure diagram schema tree for the source, each transformation rule coordinating some input or intermediate data objects to other intermediate objects or output objects, the collection of the rules forming a data flow network which maps the input structure or schema to output structure/schema, asynchronous execution of the rules in the information bridge carrying out the actual data transformations;
      processing the first high level data structure with a first schema analyzer and a recognizer generator to generate a source recognizer module;
      processing the second high level data structure with a second schema analyzer and a view generator to generate a target builder module;
      processing the high level transformation rule specification with a transformer generator to generate a transformer module;
      parsing the first high level data structure specification with the first schema analyzer to create an annotated logical structure diagram, the logical structure diagram serving as a schematic structure graph that represents the logical relationships of the source data in a context-independent uniform manner; and
      parsing the second high level data structure specification with the second schema analyzer to create an annotated logical structure diagram, the first logical structure diagram serving as a schematic structure graph that represents the logical relationships of the source data in a context-independent uniform manner.

15. The method as claimed in claim 14, wherein the first high level data structure specification and second high level data structure specification comprise:
   diverse metadata, including semantic metadata.

16. The method as claimed in claim 14, wherein inputting the first and second high level data structure specifications comprises:
   programming grammar productions;
   programming type descriptions; and
   programming annotation specifications.

17. The process as claimed in claim 16, wherein programming grammar productions comprises:
   specifying the logical structure of the heterogeneous data using grammar rules to form a uniform representation of the data, wherein a right hand side and a left hand side of each data statement of the heterogeneous data is produced.

18. The method of claim 14, further comprising:
   providing a first user interface for a first user which interacts with the combined uniform schema and data obtained from multiple data sources; and
   providing a second user interface for a second user which interacts with existing tools and various data representations.

* * * * *